United States Patent
Pelletier et al.

(10) Patent No.: US 10,575,264 B2
(45) Date of Patent: Feb. 25, 2020

(54) SYSTEMS AND METHODS FOR POWER CONTROL IN WIRELESS SYSTEMS

(71) Applicant: IDAC HOLDINGS, INC., Wilmington, DE (US)

(72) Inventors: Ghyslain Pelletier, Montreal (CA); Paul Marinier, Brossard (CA); Moon-il Lee, Melville, NY (US)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/754,620

(22) PCT Filed: Aug. 26, 2016

(86) PCT No.: PCT/US2016/048964
§ 371 (c)(1),
(2) Date: Feb. 23, 2018

(87) PCT Pub. No.: WO2017/035464
PCT Pub. Date: Mar. 2, 2017

(65) Prior Publication Data
US 2018/0242264 A1    Aug. 23, 2018

Related U.S. Application Data

(60) Provisional application No. 62/252,960, filed on Nov. 9, 2015, provisional application No. 62/222,640, filed on (Continued)

(51) Int. Cl.
*H04W 52/34* (2009.01)
*H04W 52/32* (2009.01)
*H04W 52/36* (2009.01)

(52) U.S. Cl.
CPC ....... *H04W 52/346* (2013.01); *H04W 52/325* (2013.01); *H04W 52/365* (2013.01)

(58) Field of Classification Search
CPC ... H04W 52/34; H04W 52/16; H04W 52/346; H04W 52/325
(Continued)

(56) References Cited

U.S. PATENT DOCUMENTS 8,145,251 B2 * 3/2012 Love ............... H04W 52/367
455/522
9,210,670 B2   12/2015 Papasakellariou
(Continued)

FOREIGN PATENT DOCUMENTS

WO   WO 2015/116866 A1   8/2015
WO   WO 2015/122695 A1   8/2015

OTHER PUBLICATIONS

3rd Generation Partnership Project, TS 36.213 V12.6.0, "Technical Specification Group Radio Access Network, Evolved Universal Terrestrial Radio Access (E-UTRA), Physical Layer Procedures (Release 12)", Jun. 2015, 241 pages.
(Continued)

*Primary Examiner* — John J Lee
(74) *Attorney, Agent, or Firm* — Quasim Shah

(57) ABSTRACT

Methods and systems are described for determining a total available transmission power at a time interval for a wireless/transmit unit (WTRU) and determining a power level associated with a transmission based on the total available transmission power and a spectrum operation mode (SOM). A SOM may be associated with one or more transmission characteristics. Transmission power may be allocated to the transmission according to the power level determination.

18 Claims, 12 Drawing Sheets

Related U.S. Application Data on Sep. 23, 2015, provisional application No. 62/210,242, filed on Aug. 26, 2015.

(58) Field of Classification Search
USPC ....... 455/522, 69, 452.1, 509, 454, 455, 516
See application file for complete search history.

(56) References Cited

U.S. PATENT DOCUMENTS

| | | | | |
|---|---|---|---|---|
| 2012/0309439 | A1* | 12/2012 | Sawai | H04W 52/24 |
| | | | | 455/501 |
| 2016/0007307 | A1* | 1/2016 | Wei | H04W 56/001 |
| | | | | 370/328 |
| 2017/0079083 | A1* | 3/2017 | Siomina | H04W 76/14 |

OTHER PUBLICATIONS

3rd Generation Partnership Project, TS 36.300 V12.5.0, "Technical Specification Group Radio Access Network, Evolved Universal Terrestrial Radio Access (E-UTRA) and Evolved Universal Terrestrial Radio Access Network (E-UTRAN),Overall Description, Stage 2 (Release 12)", Mar. 2015, 251 pages.

3rd Generation Partnership Project, TS 36.321 V12.6.0, "Technical Specification Group Radio Access Network, Evolved Universal Terrestrial Radio Access (E-UTRA), Medium Access Control (MAC) Protocol Specification (Release 12)", Jun. 2015, 77 pages.

3rd Generation Partnership Project, TS 36.331 V12.6.0, "Technical Specification Group Radio Access Network, Evolved Universal Terrestrial Radio Access (E-UTRA), Radio Resource Control (RRC), Protocol Specification (Release 12)", Jun. 2015, 449 pages.

* cited by examiner

SYSTEMS AND METHODS FOR POWER CONTROL IN WIRELESS SYSTEMS

CROSS-REFERENCE TO RELATED APPLICATIONS

This application is the National Stage entry under 35 U.S.C. § 371 of Patent Cooperation Treaty Application PCT/US2016/048964, filed Aug. 26, 2016, which claims the benefit of U.S. Provisional Patent Application No. 62/210,242, filed on Aug. 26, 2015, U.S. Provisional Patent Application No. 62/222,640, filed on Sep. 23, 2015, and U.S. Provisional Patent Application No. 62/252,960, filed on Nov. 9, 2015, each of which is hereby incorporated into the instant disclosure by reference in its entirety.

BACKGROUND

Mobile communications are in continuous evolution. The mobile communications industry is currently determining and implementing technologies associated with a fifth generation of mobile communications standards, often referred to as "5G." A 5G compliant network may be built to utilize Radio Access Technologies (RATs) such as flexible spectrum usage, smaller transmission time intervals, variable transmission time intervals, multicarrier modulation waveforms, flexible scheduling, and/or flexible rate control. As the technologies associated with 5G are developed, a challenge that may arise is the determination of how to efficiently allocate transmission power at a wireless transmit/receive unit (WTRU) for transmissions characterized by various attributes and/or relationships to other transmissions.

SUMMARY

Methods and systems are described for determining a total available transmission power at a time interval for a wireless/transmit unit (WTRU) and determining a power level associated with a transmission based on the total available transmission power and a spectrum operation mode (SOM). A SOM may be associated with one or more transmission characteristics. Transmission power may be allocated to the transmission according to the power level determination.

Disclosed methods and systems may allocate power for transmissions in a wireless communication system that may employing flexible radio access technologies (RAT), for example when the transmissions are at least partially overlapping in time using one or more radio interfaces. Power allocation may be performed for a single cell/carrier, for multiple cells/carriers using a single MAC instance (e.g., by Carrier Aggregation) or for multiple cells/carriers each using a different MAC instance (e.g., by Dual Connectivity principles).

Examples described herein include methods and systems related to transmissions characterized by one or more of a radio access technology, one or more MAC instances, waveform characteristics (e.g., CP-based OFDM and Filtered OFDM), a transmission time interval, and/or QoS characteristics (e.g., as may be derived by HARQ processing or other indication such as ultra-low latency, ultra-reliable transmissions, broadband, etc.).

Examples described herein include methods and systems that may perform power reservation by taking into consideration the presence or identity of one or more of one or more MAC instances and/or MAC sub-layers associated with a transmission, one or more control channels utilized (e.g., for the grant/allocation) or aspect thereof including search space and DCI type, one or more transport channels associated with a transmission, one or more HARQ processing types, one or more RNTIs; one or more groups of cells, carriers, and/or spectrum blocks, one or more SOMs (e.g., a group of one or more transmission characteristics), a TTI duration, an initial power level, a HARQ processing type, an upper bound for successful HARQ reception and/or transmission, a transmission mode, a physical channel (uplink or downlink), a waveform type, a transmission according to a specific RAT, a QoS level and/or related aspect (e.g., maximum/target latency, maximum/target BLER, or the like), a scheduling metho, and/or a Power Control mode (PCM).

DETAILED DESCRIPTION OF ILLUSTRATIVE EXAMPLES

A detailed description of illustrative examples will now be described with reference to the various figures. Although this description provides a variety of detailed examples of possible implementations, it should be noted that the details of each such disclosed example are intended to be illustrative and in no way should be construed to limit the scope of the instant application.

Figure 1A:
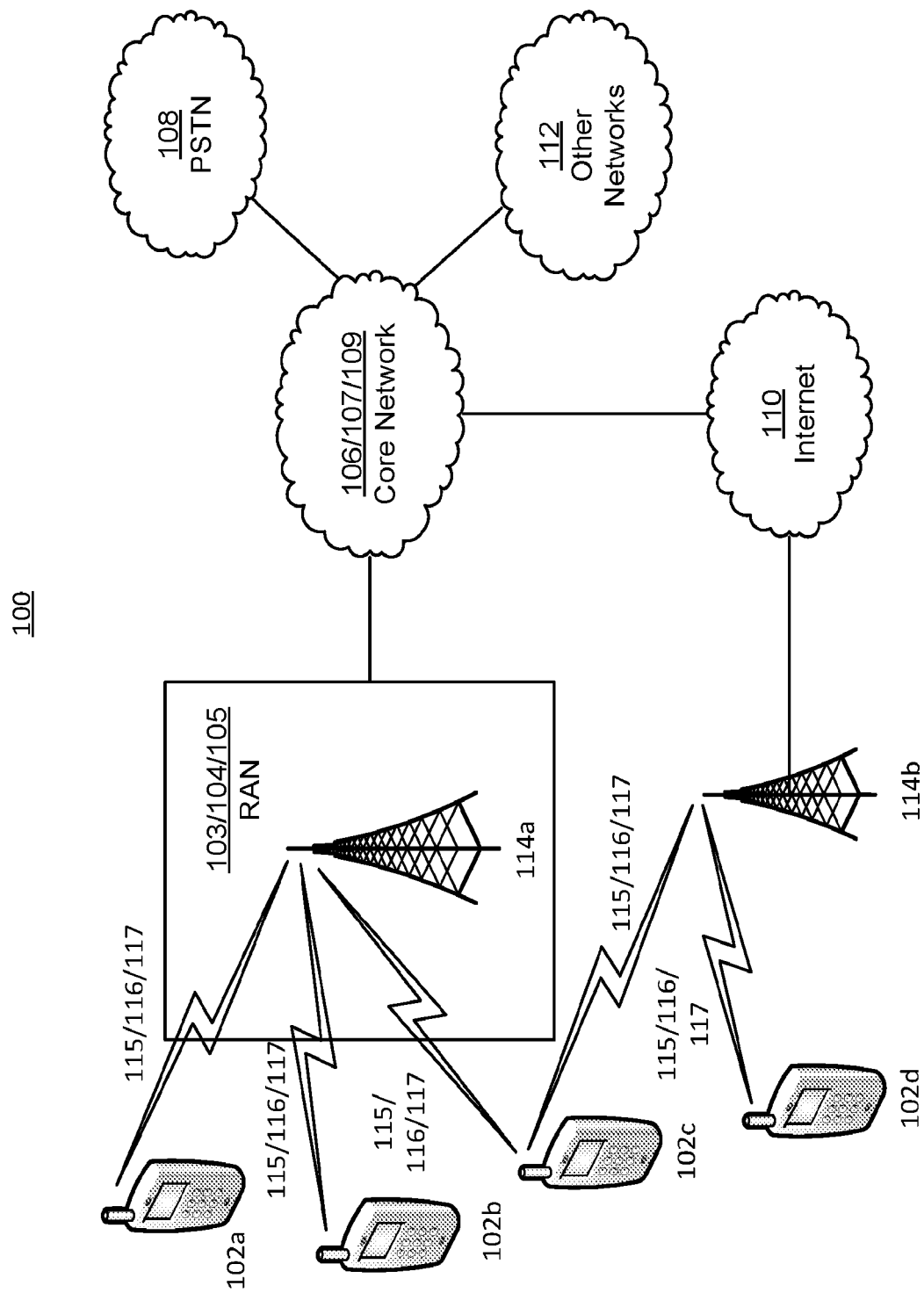
FIG. 1A is a system diagram of an exemplary communications system in which one or more of the disclosed examples may be implemented.

FIG. 1A is a diagram of an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), orthogonal frequency-division multiplexing with offset quadrature amplitude modulation (OFDM-OQAM), universal filtered orthogonal frequency-division multiplexing (UF-OFDM), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed examples contemplate any number of WTRUs, networks, and/or network elements.

The communications systems 100 may also include a number of base stations, e.g., base station 114a and base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one examples, the base station 114a may include three transceivers, i.e., one for each sector of the cell. In another examples, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, OFDM-OQAM, UF-OFDM and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another example, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE), LTE-Advanced (LTE-A) and/or 5gFLEX.

In other examples, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one example, the base station 114b and the WTRUs 102c, 102d may implement a radio technology such as IEEE 802.11 to establish a wireless local area network (WLAN). In another example, the base station 114b and the WTRUs 102c, 102d may implement a radio technology such as IEEE 802.15 to establish a wireless personal area network (WPAN). In yet another example, the base station 114b and the WTRUs 102c, 102d may utilize a cellular-based RAT (e.g., WCDMA, CDMA2000, GSM, LTE, LTE-A, 5gFLEX, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
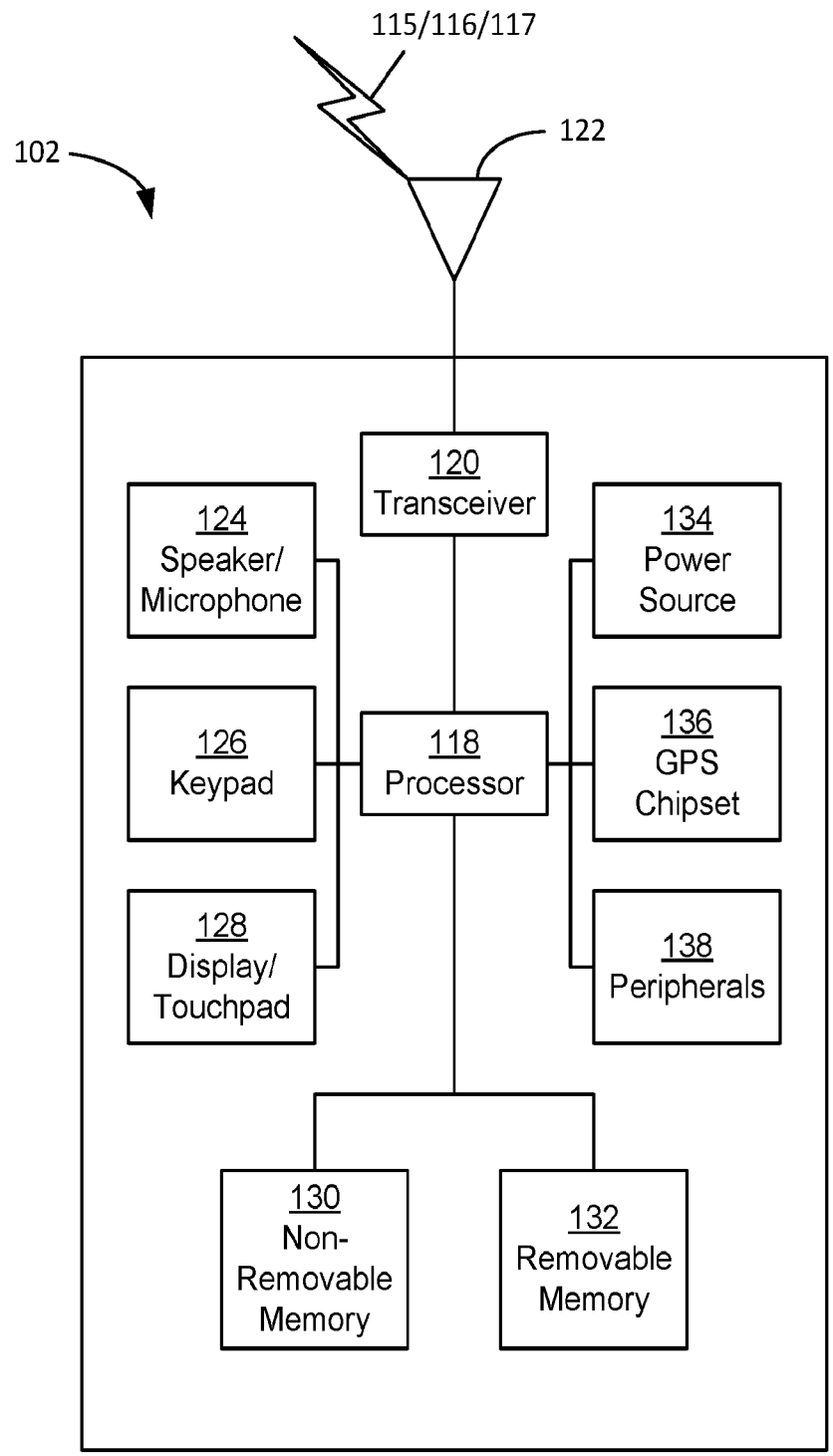
FIG. 1B is a system diagram of an exemplary wireless transmit/receive unit (WTRU) that may be used within the communications system illustrated in FIG. 1A.

FIG. 1B is a system diagram of an example WTRU 102. As shown in FIG. 1B, the WTRUs 102a, 102b, 102c, 102d may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example.

The processor 118 of the WTRU 102 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 of the WTRU 102 may be configured to transmit signals to, or receive signals from, a base station (e.g., the base station 114a) over the air interface 115/116/117. For example, in an example, the transmit/receive element 122 may be an antenna configured to transmit and/or receive RF signals. In another example, the transmit/receive element 122 may be an emitter/detector configured to transmit and/or receive IR, UV, or visible light signals, for example. In yet another example, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 115/116/117.

The transceiver 120 of the WTRU 102 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other examples, the processor 118 may access information from, and store data in, memory that is not physically located on the WTRU 102, such as on a server or a home computer.

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an example.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
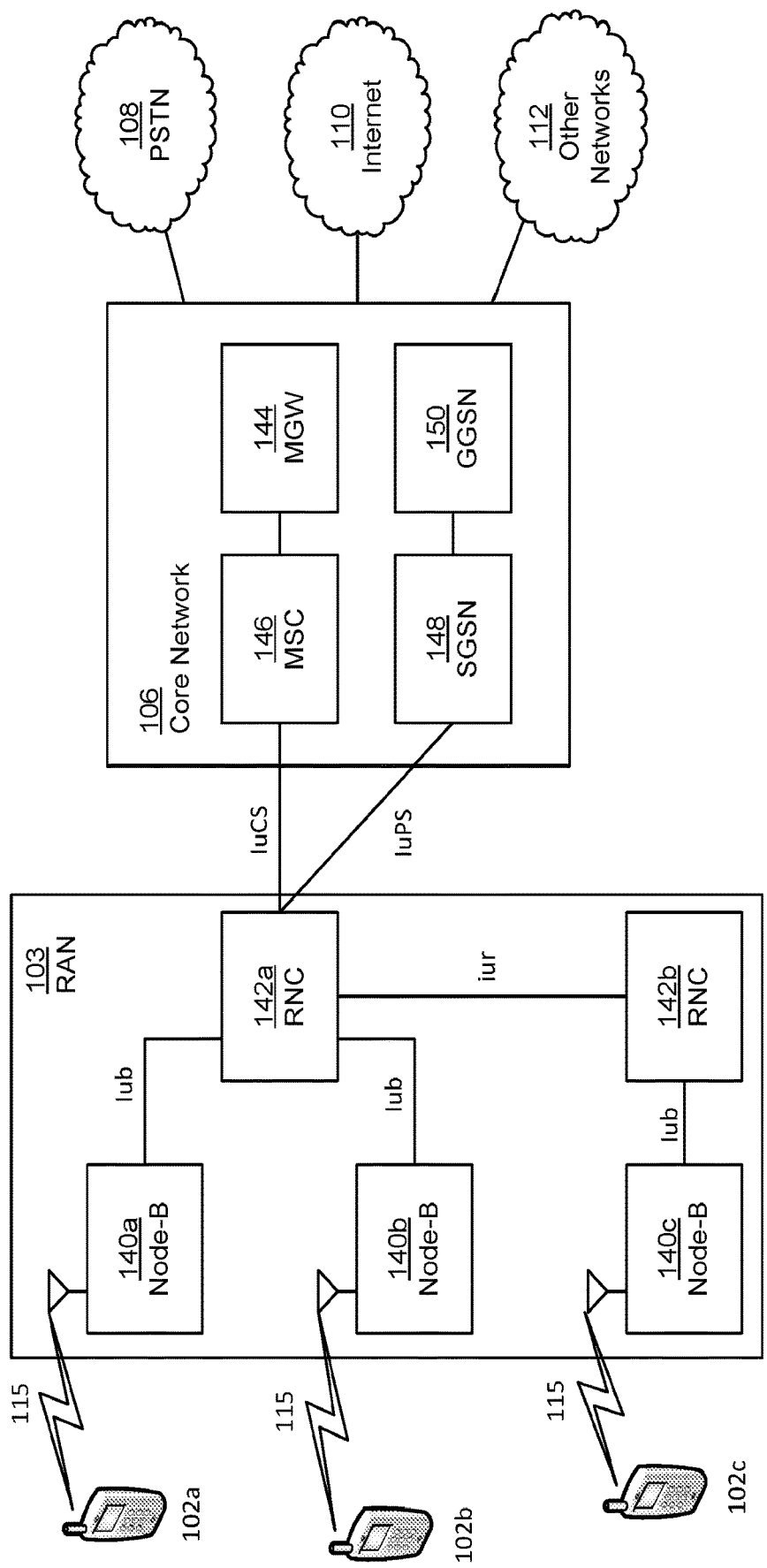
FIG. 1C is a system diagram of an exemplary radio access network and an example core network that may be used within the communications system illustrated in FIG. 1A.

FIG. 1C is a example system diagram of RAN 103 and core network 106. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that in this example, the RAN 103 may include any number of Node-Bs and/or RNCs.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
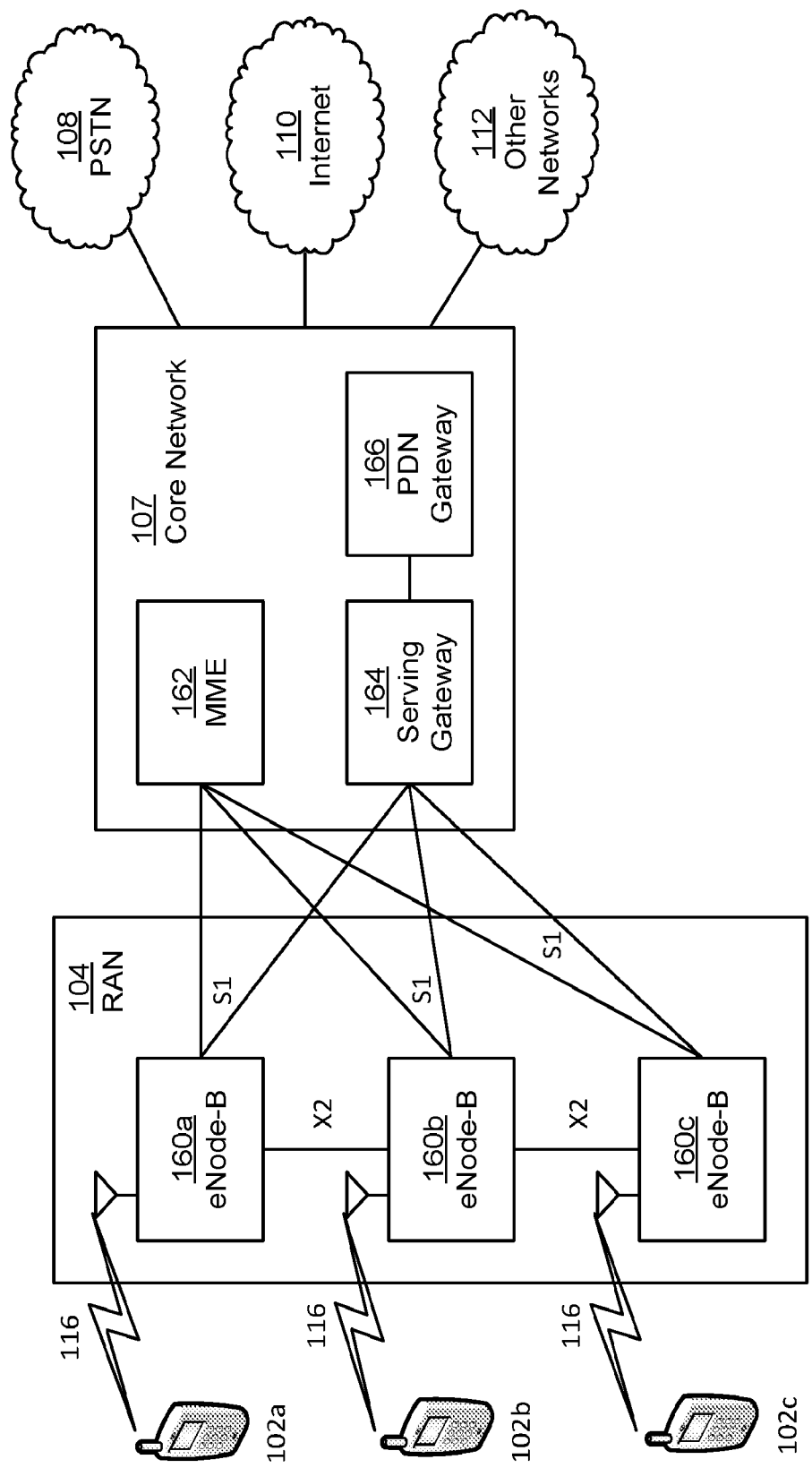
FIG. 1D is a system diagram of another exemplary radio access network and an exemplary core network that may be used within the communications system illustrated in FIG. 1A.

FIG. 1D is an example system diagram of RAN 104 and core network 107. As noted above, the RAN 104 may employ an E-UTRA radio technology to communicate with the WTRUs 102a, 102b, 102c over the air interface 116. The RAN 104 may also be in communication with the core network 107.

In an example, RAN 104 may include eNode-Bs 160a, 160b, 160c, though it will be appreciated that RAN 104 may include any number of eNode-Bs. ENode-Bs 160a, 160b, 160c may each include one or more transceivers for communicating with the WTRUs 102a, 102b, 102c over the air interface 116. In an example, eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
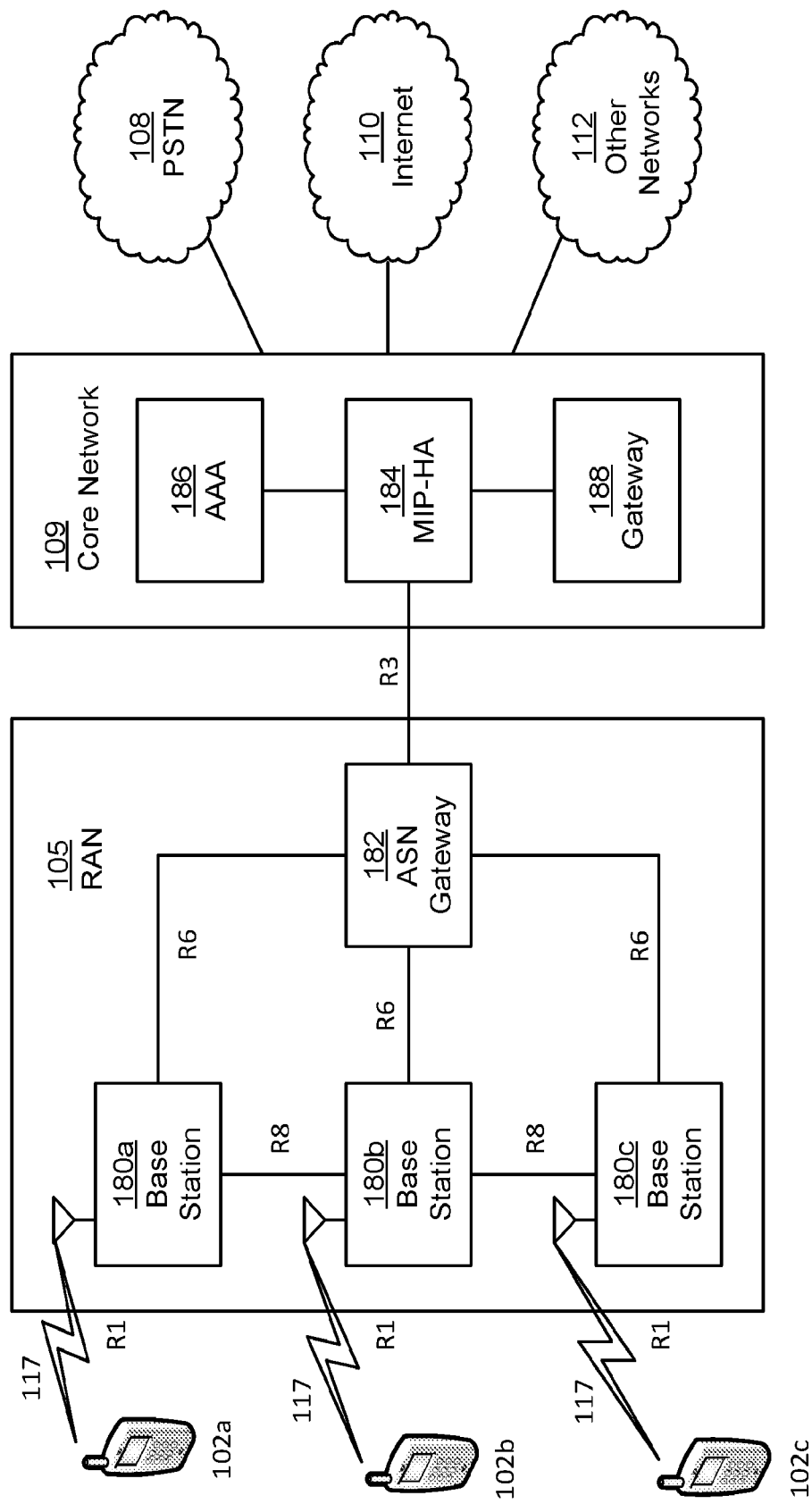
FIG. 1E is a system diagram of another exemplary radio access network and an exemplary core network that may be used within the communications system illustrated in FIG. 1A.

FIG. 1E is an exemplary system diagram of RAN 105 and core network 109. RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, RAN 105 may include base stations 180a, 180b, 180c, and ASN gateway 182, though it will be appreciated that RAN 105 may include any number of base stations and/or ASN gateways in other examples. Base stations 180a, 180b, 180c may each be associated with a particular cell (not shown) in the RAN 105 and may each include one or more transceivers for communicating with the WTRUs 102a, 102b, 102c over the air interface 117. In an example, base stations 180a, 180b, 180c may implement MIMO technology. Thus, base station 180a, for example, may use multiple antennas to transmit wireless signals to, and receive wireless signals from, the WTRU 102a. Base stations 180a, 180b, 180c may also provide mobility management functions, such as handoff triggering, tunnel establishment, radio resource management, traffic classification, quality of service (QoS) policy enforcement, and the like. ASN gateway 182 may serve as a traffic aggregation point and/or may be responsible for paging, caching of subscriber profiles, routing to core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. MIP-HA 184 may provide WTRUs 102*a*, 102*b*, 102*c* with access to packet-switched networks, such as Internet 110, to facilitate communications between WTRUs 102*a*, 102*b*, 102*c* and IP-enabled devices. AAA server 186 may be responsible for user authentication and for supporting user services. Gateway 188 may facilitate interworking with other networks. For example, gateway 188 may provide WTRUs 102*a*, 102*b*, 102*c* with access to circuit-switched networks, such as PSTN 108, to facilitate communications between WTRUs 102*a*, 102*b*, 102*c* and traditional land-line communications devices. In addition, gateway 188 may provide WTRUs 102*a*, 102*b*, 102*c* with access to networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

A communication system as described above may support dual connectivity (DC), which may allow WTRUs 102*a*, 102*b*, 102*c* to communicate with multiple eNBs simultaneously using a different MAC instance (and thus each WTRU may be independently scheduled) for each cell group (CG). The multiple eNBs may include a master eNB (MeNB) and one or more slave eNBs (SeNBs). A non-ideal backhaul connection may exist between the MeNB and the SeNBs. Radio resource control (RRC) may be terminated in the MeNB. In some implementations, there may not be L3/RRC signaling between the WTRUs and the SeNB.

Deployment of small cells in a DC-enabled system may be such that synchronization between CGs can be either synchronous or asynchronous. In some implementations, inter-CG synchronization is considered synchronous when the maximum timing difference between cells of different eNBs is less than or equal to a value, for example, 33 μs. When a maximum timing difference between cells of different eNBs may be greater than the value (e.g., 33 μs) and less than or equal to another (e.g., 500 μs), according to some examples, inter-CG synchronization may be considered asynchronous. In an example, a DC-enabled system may assume that a non-ideal backhaul connection exists between an MeNB and an SeNB. In such an example, an RRC may terminate in an MeNB and/or there may be no L3 signaling between a user equipment (UE, which may be also be referred to interchangeably herein as a WTRU) or a WTRU, and an SeNB.

Example communication systems according to the instant disclosure may include features designed to support improved broadband performance (IBB), industrial control and communications (ICC), vehicular applications (V2X), and/or massive Machine-Type Communications (mMTC).

An example system according to the instant disclosure may provide for baseband filtering of a frequency-domain waveform, where such filtering may enable aggregation of multiple frequency-bands of varying sizes, such as aggregation of up to 150-200 MHz total spectrum within a given RF transceiver path, without relying on a re-design of a front end of such a system.

Exemplary systems performing aggregation of spectrum across widely separated operating bands (e.g. 900 MHz and 3.5 GHz) according to the instant disclosure may include multiple RF transceiver chains due to, for example, antenna size requirements and/or amplifier optimization design constraints. For example, a WTRU implementation may include, e.g., three separate RF transceiver paths, such as a first one below 1 GHz, a second one for a 1.8-3.5 GHz frequency range, and a third one for a 4-6 GHz frequency range. Support for a massive MIMO antenna configuration may also be supported by such an exemplary system.

An exemplary system according to the instant disclosure may achieve data rates on the order of several tens of Mbps (e.g., at a cell edge) up to, for example, a peak data rate of several Gbps (e.g., up to 8 Gbps). In some examples, rates of the order of several hundreds of Mbps may be achieved. Such data rates may be achieved by more efficiently aggregating multiple frequency bands with spectrum of varying sizes. For example, in some exemplary systems, aggregation of up to 150-200 MHz total spectrum may be accomplished within a given RF transceiver path without redesigning the front end of a legacy system. In other exemplary implementations, as noted above, aggregation of spectrum across widely separated operating bands (e.g., 900 MHz and 3.5 GHz) may be achieved by using multiple RF transceiver chains to overcome antenna size requirements and/or amplifier optimization design constraints. For example, again as noted above, a WTRU may include multiple separate RF transceiver paths that may include a first path below 1 GHz, a second path for a 1.8-3.5 GHz frequency range, and a third path covering a 4-6 GHz frequency range.

Radio access technologies as disclosed herein may support ultra-low transmission latency. For example, one or more example communication systems (e.g., ICC or V2X) may have a design goal of achieving end-to-end (e2e) latency of less than 10 ms. In an example, an air interface latency of as low as 1 ms round-trip time (RTT) may be accomplished by shortening transmission time intervals (TTIs) to, e.g., between 100 µs and 250 µs. In other examples according to the instant disclosure, ultra-low access latency (e.g., time from initial system access until completion of a transmission by a first user plane data unit) may be supported.

Other functional supports may also be available. For example, there may be backward compatibility with legacy interfaces (or one or more evolutions thereof) such as an interface to a legacy core network (CN) (e.g., an S1 interface and NAS) and/or eNBs (e.g., an X2 interface that may include dual connectivity with LTE). Integration with legacy aspects such as QoS and/or security mechanisms may also, or instead, be supported.

Design elements may be retrofitted into legacy systems (e.g., LTE Evolution). For example, TTIs may be shorter than an LTE slot (e.g., 0.5 ms) and/or may use a different waveform to enable ultra-low latency. Downlink (DL) and/or uplink (UL) physical layers may be operated in time division multiplexing (TDM) and/or frequency division multiplexing (FDM) with LTE.

In an example according to the instant disclosure, support may be provided for device to device transmissions (e.g., D2D/Sidelink), license assisted access (LAA) operation using listen-before-talk (LBT) techniques, relaying, and/or support for ultra-reliable transmissions (e.g., as desired by ICC and V2X, which may have a target rate of 99.999% for both transmission success and service availability over a mobility range of 0-500 km/h).

Further, common mMTC activities may also be supported that may include narrowband operations (e.g., using less than 200 KHz), extended battery life (e.g., up to 15 years of autonomy), and relatively low communication overhead for small and/or infrequent data transmissions (e.g., low data rate in the range of 1-100 kbps that may have access to latency of seconds to hours). Some mMTC examples may use narrowband operation, where a link budget comparable to that of LTE extended coverage may be utilized while support for a large number of MTC devices (e.g., devices within up to 200 k/km$^2$) may be provided without causing a substantial adverse impact on spectral efficiency for other supported services.

In examples described herein, an exemplary system may implement flexible spectrum usage, deployment strategies, and/or operation, for example to provide support for multiple types of applications that may be associated with different QoS requirements. For example, an exemplary system may use spectrum of varying sizes and/or may aggregate non-adjacent carriers in a same and/or a different frequency band (e.g., licensed or unlicensed). These systems may also support narrowband and wideband operation, different duplexing methods (e.g., time-division duplexing (TDD), dynamically variable DL/UL allocation, and/or the like), variable TTIs lengths and/or a same TTI length with an approximately constant offset between CGs, scheduled and unscheduled transmissions, synchronous and asynchronous transmissions, separation of a user plane from a control plane, multi-node connectivity, physical layer QoS (e.g., new per-transmission requirements), and/or simultaneous FDD and TDD (e.g., self-contained TDD) transmissions.

Some example systems (e.g., LTE, IEEE 802.11) may use OFDM as a basic signal format for data transmissions. Also, additional power reduction may be applied to uplink transmissions to comply with spectral emission requirements of adjacent bands, e.g., in the presence of transmission spectrum aggregation. OFDM may divide spectrum into multiple parallel orthogonal sub-bands. One or more subcarriers may be shaped using a rectangular window in the time domain leading to sinc-shaped subcarriers in the frequency domain. Thus, OFDMA examples may be based on a high degree of frequency synchronization and/or management of uplink timing alignment within a duration of a cyclic prefix to maintain orthogonality between signals and/or to minimize inter-carrier interference.

An exemplary system may implement one or more RF requirements, for example in an exemplary system that may include use of OFDM (e.g., an exemplary system utilizing cyclic prefix (CP) OFDM (CP-OFDM)) and that may be operating using, e.g., a relatively large amount of contiguous spectrum that may not be used in aggregation. A CP-based OFDM transmission scheme implemented according to an example may utilize a downlink physical layer that may be similar to that of a legacy system, for example, with modifications to pilot signal density and/or location.

While some exemplary systems may employ OFDM, for example, for use with certain transmission schemes (e.g., a downlink transmission scheme), some exemplary wireless access systems may utilize other waveform candidates such as, e.g., OFDM-OQAM and/or Universal Filtered Multi-Carrier (UFMC) (which may also be referred to as "UF-OFDM," and which may be referred to herein as "UFMC/UF-OFDM"), each of which may be multicarrier waveforms that may be characterized by high-spectral containment (e.g., lower side lobes and/or lower out-of-band (OOB) emissions). Multicarrier modulation waveforms may divide a channel into sub-channels and may modulate data symbols on subcarriers in such sub-channels. In examples utilizing OFDM-OQAM, a filter may be applied in a time domain per subcarrier to an OFDM signal, where such a subcarrier may reduce OOB emissions. OFDM-OQAM examples may generate less interference to adjacent bands and/or may not require relatively large guard bands or a cyclic prefix. Exemplary systems utilizing OFDM-OQAM may employ filtered band multi-carrier (FBMC) techniques. In such exemplary systems, OFDM-OQAM may be sensitive to multipath effects and/or to high delay spread in terms of orthogonality and may also increase the relative complication of equalization and/or channel estimation.

In an example implementing UFMC/UF-OFDM, a filter may be applied in a time domain to an OFDM signal, where such a filter may contribute to reducing OOB emissions. In such an example, or in other exemplary systems, filtering may be applied per sub-band facilitating the use of spectrum fragments, which may reduce complexity and/or assist in making UFMC/UF-OFDM relatively easier to implement. In such UFMC/UF-OFDM examples, improvements over OFDM at the edges of the filtered spectrum may be seen. If, in such exemplary systems, there are one or more unused spectrum fragments in a band, OOB emissions in such fragments may similar to OOB emissions seen in conventional OFDM examples.

Multicarrier waveforms according to the instant disclosure, such as, but not limited to, OFDM-OQAM and UFMC/UF-OFDM, may enable multiplexing for signals that may have non-orthogonal characteristics (e.g., signals that may have different subcarrier spacing). Such waveforms may facilitate the co-existence of asynchronous signals and may not rely on the utilization of complex interference cancellation receivers. Such waveforms may also, or instead, facilitate aggregation of fragmented pieces of spectrum in a baseband processing as a lower cost alternative to implementation as part of RF processing.

In an example, co-existence of different waveforms within a same band may support mMTC narrowband operation, for example, where an exemplary system uses single carrier multiple access (SCMA). In an example, a combination of different waveforms within a same band may be supported. For example, any or all of CP-OFDM, OFDM-OQAM, and UFMC/UF-OFDM may be combined for some or all aspects set forth in the instant disclosure (e.g., some examples may be described with respect to a certain waveform type, such as CP-OFDM, but such an example may be applied to a different waveform type, such as UF-OFDM, and still be consistent with the instant disclosure). Any or all of CP-OFDM, OFDM-OQAM, and UFMC/UF-OFDM may be combined for one or both of downlink and uplink transmissions. For example, a WTRU may be configured to simultaneously receive two or more waveform types (e.g., CP-OFDM, OFDM-OQAM, UFMC/UF-OFDM, etc.) in the downlink A WTRU may be configured to simultaneously transmit two or more waveform types (e.g., CP-OFDM, OFDM-OQAM, UFMC/UF-OFDM, etc.) in the uplink. Transmissions that may use different types of waveforms between different WTRUs and/or with a same WTRU (e.g., simultaneous transmissions, partially overlapping transmissions, and/or consecutive transmissions in a time domain) may be supported by some exemplary systems. Other waveform co-existence aspects that may be supported by one or more of the disclosed examples may include support for hybrid types of waveforms (e.g., waveforms and/or transmissions that may support one or more varying CP durations from one transmission to another), support for a combination of a CP and a low power tail (e.g., a zero tail), support for one or more forms of hybrid guard interval (e.g., using a low power CP and an adaptive low power tail), and the like.

In an example, a WTRU and/or base station/network unit may be configured to support waveforms that may utilize dynamic variation. For example, a manner in which filtering may be applied may also be controlled dynamically. For example, filtering may be applied over a first spectrum range that may be used for receiving transmissions for a given carrier frequency, over a second spectrum range that may be used for receiving transmissions that may be associated with a spectrum operation mode (SOM), and/or per sub-band and/or of one or more sub-bands. For example, a SOM may refer to a specific type of transmission scheme and/or a transmission scheme that may be used for performing a certain-type of communication (e.g., a low latency communication, a high reliability communication, etc.). A SOM may be defined according to one or more of a subcarrier spacing, a transmission time interval (TTI) length, one or more reliability aspects (e.g., HARQ processing aspects), and/or one or more waveform types.

In an example, an uplink transmission scheme may use a same waveform as, or a different waveform from, a waveform that may be used for a downlink transmission in such an example. Multiplexing of transmissions to and/or from different WTRUs in a same cell may be based on FDMA and/or TDMA. Waveforms as described herein should be recognized as illustrative examples and should not be construed to limit any of the systems and methods disclosed herein.

Exemplary systems and methods as set forth herein may be characterized by a relatively high degree of spectrum flexibility. Such spectrum flexibility may facilitate the deployment of such systems and methods using different frequency bands with different characteristics, such as, but not limited to, different duplex arrangements, different and/or variable size spectrum, contiguous and non-contiguous spectrum allocations in a same or different bands, and/or the like. Variable timing aspects, such as, but not limited to, multiple TTI lengths and/or asynchronous transmissions may also be supported in some examples.

Spectrum flexibility may be reflected in a duplexing arrangement. For example, both TDD and FDD duplexing schemes may be supported. For FDD operation, a supplemental downlink operation may be supported using spectrum aggregation. FDD operation may support full-duplex FDD and/or half-duplex FDD operation. For TDD operation, DL/UL allocation may be dynamic. For example, a length of a DL or a UL transmission interval may be set per transmission opportunity rather than based on a fixed DL/UL frame configuration.

Spectrum flexibility may also, or instead, be reflected by a capability of an exemplary system of providing different transmission bandwidths on both uplink and downlink, in some examples, with a range between a nominal system bandwidth and a maximum value corresponding to the exemplary system's bandwidth.

Figure 2:
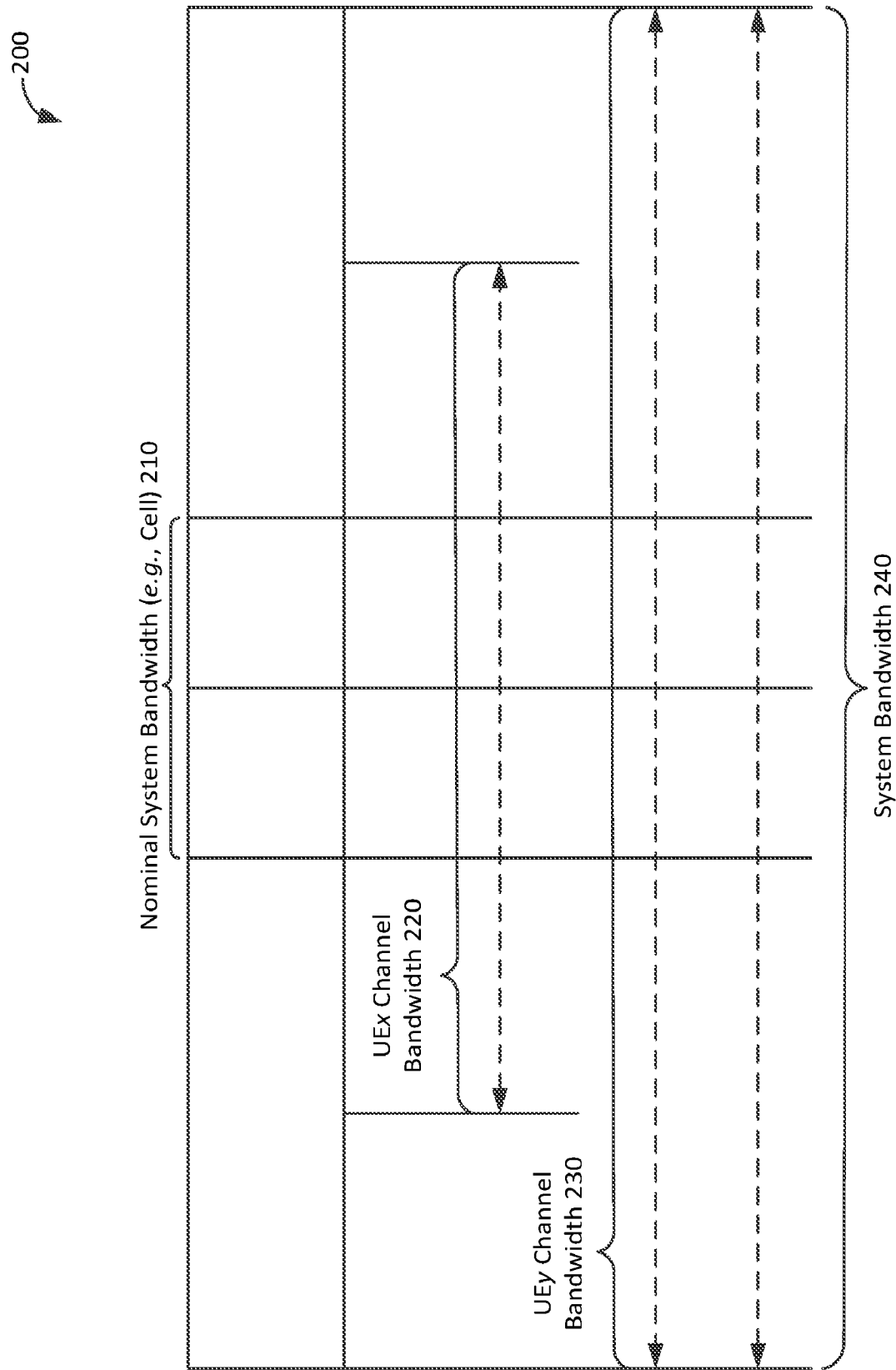
FIG. 2 is a graphical illustration of an example of bandwidth flexibility.

FIG. 2 shows chart 200 illustrating an example of bandwidth flexibility that may be facilitated by one or more of the exemplary systems and methods set forth herein. "System bandwidth" as used herein may refer to a largest portion of spectrum that may be managed by a network for a given carrier. In FIG. 2, exemplary system bandwidth 240 is shown and may be any portion of spectrum, such as, for example, 20 MHz. A portion of spectrum that a WTRU minimally supports for cell acquisition, measurements, and/or initial access to a network may correspond a nominal system bandwidth. In FIG. 2, exemplary nominal system bandwidth 210 is shown and may be any portion of a system bandwidth, such as, for example, a 5 MHz portion of a system bandwidth. A first WTRU may be configured with a channel bandwidth that may be within a range of an entire system bandwidth. In FIG. 2, exemplary channel bandwidth 220 is shown associated with WTRUx and may be any portion of a system bandwidth, such as, for example, a 10 MHz portion of a system bandwidth. Exemplary channel bandwidth 230 is also shown in FIG. 2 and associated with WTRUy. Exemplary channel bandwidth 230 may be any portion of a system bandwidth, such as, for example, a 20 MHz portion of a system bandwidth. A WTRU's configured channel bandwidth 220 or 230 may or may not include nominal part 210 of system bandwidth, as shown in FIG. 2.

For single carrier operation examples, supported system bandwidths may vary, e.g., from a few MHz up to 160 MHz (or greater). Supported bandwidths may include at least 5, 10, 20, 40, and 80 MHz. Nominal bandwidths may have one or more fixed values. For example, narrowband transmissions of up to 200 KHz may be supported within an operating bandwidth for Machine-type Communications (MTC) devices.

Bandwidth flexibility may be achieved, at least in part, due to efficiently supporting baseband filtering of a frequency domain waveform. Because of such support, an applicable set of RF requirements for a given maximum operating bandwidth in a band may be met without introducing additional allowed channel bandwidths for that operating band. Furthermore, some example systems may use a band-agnostic physical layer and support operation in licensed bands below 5 GHz as well as unlicensed bands in the range of 5 to 6 GHz. For operation in unlicensed bands, LBT Cat 4 based channel access framework, e.g., similar to LTE LAA, may be supported.

A base station and/or a WTRU may configure, reconfigure, and/or dynamically change the WTRU's channel bandwidth for single carrier operation. Such a base station and/or WTRU may be configured to allocate spectrum for narrowband transmissions within a nominal system bandwidth, a system bandwidth, or a configured channel bandwidth. The WTRU and/or the base station may be configured to scale and manage (e.g., scheduling, addressing of resources, broadcasted signals, and measurements) cell-specific and/or WTRU-specific channel bandwidths for various spectrum block sizes.

Figure 3:
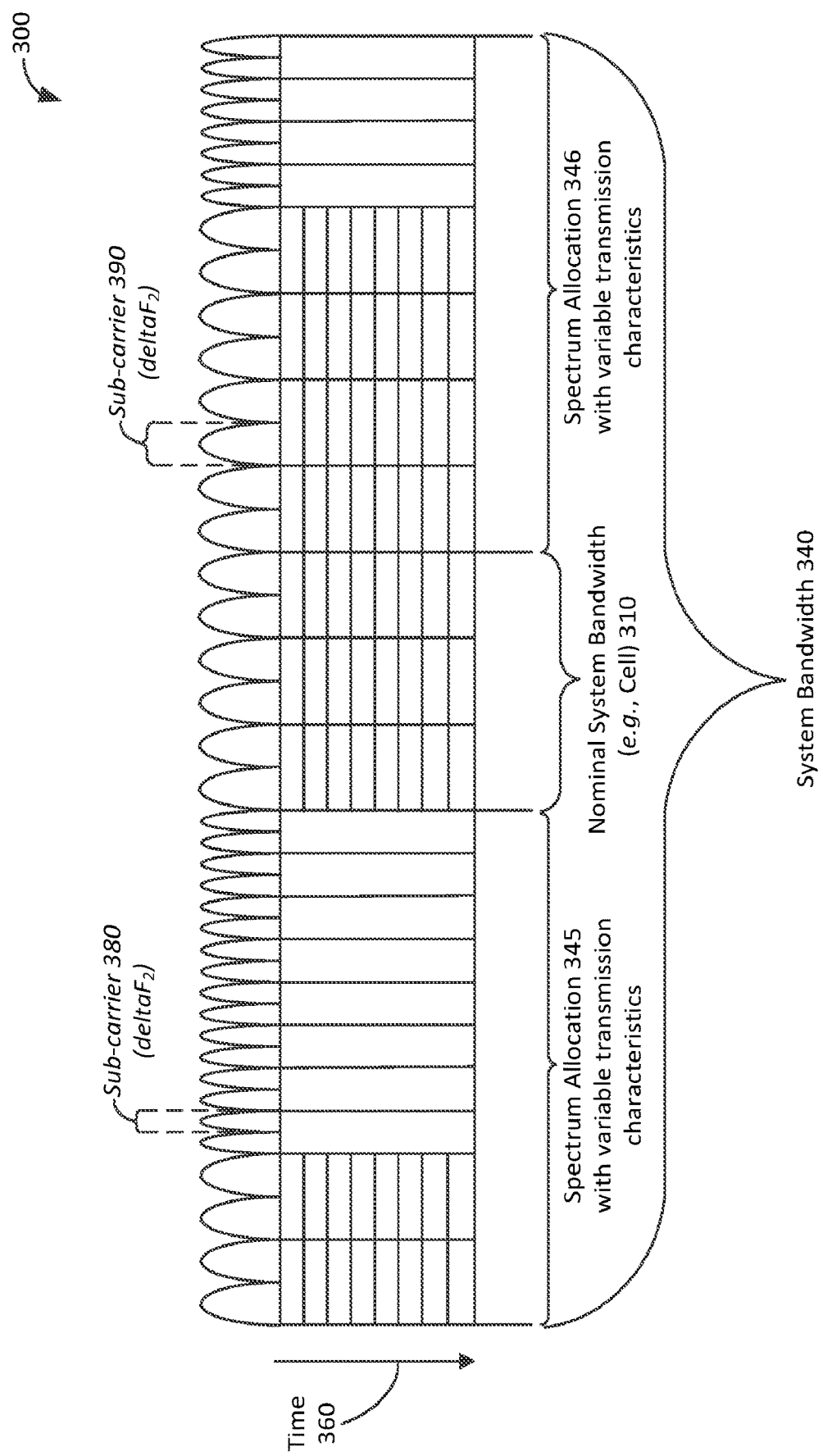
FIG. 3 is an illustration of an example of flexible spectrum allocation.

Spectrum flexibility may be implemented using flexible spectrum allocation, an illustrative example of which is illustrated by allocation chart 300 of FIG. 3. In such example systems, downlink control channels and/or signals may support FDM operation. A WTRU may acquire a downlink carrier by receiving transmissions using, for example, a nominal part (e.g., nominal system bandwidth 310 shown in FIG. 3) of a system bandwidth (e.g., system bandwidth 340 shown in FIG. 3) and time 360. A WTRU may not initially receive transmissions covering the entire bandwidth managed by a network for a carrier. Downlink data channels may be allocated over a bandwidth that may or may not correspond to a nominal system bandwidth. In an example, there may be few restrictions to such an allocation (e.g., such allocations may be restricted, to being within the WTRU's configured channel bandwidth). For example, a network may operate a carrier with a 12 MHz system bandwidth using a 5 MHz nominal bandwidth. In such an exemplary system, devices that support up to 5 MHz RF bandwidth may acquire and access the system while allocating +10 to −10 MHz of a carrier frequency to other WTRUs that may support up to 20 MHz worth of channel bandwidth, for example.

Spectrum allocation where different subcarriers may be assigned to different spectrum operation modes (SOMs) may be used, an example of which is shown in FIG. 3 (e.g., spectrum allocations 345 and 346 shown in FIG. 3). Different SOMs may be used to fulfill different requirements for different transmissions. A SOM may include one or more aspects that may be related to numerology that may be applicable to a transmission, such as, e.g., one or more of a subcarrier spacing and a transmission duration (e.g., a TTI length).

A SOM may also, or instead, include one or more other aspects that may be related to a transmission, such as a transmission mode, one or more reliability aspects (e.g., one or more HARQ processing aspects), a beamforming configuration, an applicable control channel, and/or an association with a secondary control channel. For example, a specific transport block may correspond to a specific SOM from a perspective of a MAC entity. For example, in non-limiting example 300 illustrated in FIG. 3, sub-carrier 380 may be associated with a different sub-carrier spacing than that of sub-carrier 390. A SOM may be used to refer to a specific waveform and/or may be related to a processing aspect, e.g., support for the co-existence of different waveforms in the same carrier using FDM and/or TDM. A SOM may be used in cases where co-existence of FDD operation in a TDD band is supported, e.g., in a TDM manner.

Spectrum flexibility may be achieved by using flexible spectrum aggregation. For single carrier operation examples, spectrum aggregation may be supported where the WTRU may be capable of transmitting and receiving multiple transport blocks over contiguous or non-contiguous sets of physical resource blocks (PRBs) within a same operating band. Mapping of a single transport block to separate sets of PRBs may be used.

For multicarrier operation examples, spectrum aggregation may be supported by using contiguous or non-contiguous spectrum blocks within a same operating band or across two or more operating bands. Aggregation of spectrum blocks using different modes (e.g., FDD, TDD) and/or using different channel access methods (e.g., licensed and/or unlicensed band operation below 6 GHz) may be supported. Methods and systems for configuring, reconfiguring, and/or dynamically changing a WTRU's multicarrier aggregation may be used in an example. By using efficient baseband filtering in a frequency domain, a highly flexible spectrum aggregation, e.g., as described herein, may not use RF specification adjustments to support additional channels and/or band combinations.

Spectrum flexibility may be achieved by using flexible framing, timing, and/or synchronization techniques. For example, downlink and/or uplink transmissions may be organized into radio frames that may be characterized by one or more fixed aspects (e.g., a location of downlink control information) and one or more varying aspects (e.g., transmission timing, supported types of transmissions, and/or the like). A basic time interval (BTI) may be expressed in terms of an integer number of symbol(s), where a duration of each such symbol may be a function of sub-carrier spacing applicable to a time-frequency resource.

For FDD, subcarrier spacing may differ between an uplink carrier frequency $f_{UL}$ and a downlink carrier frequency $f_{DL}$, for a given frame. A transmission time interval (TTI) may be defined as a minimum time supported between consecutive transmissions where each such transmission may be associated with different transport blocks (TBs) for downlink ($TTI_{DL}$) or uplink (UL TRx). A preamble may be included. Control information (e.g., downlink control information (DCI) for downlink, uplink control information (UCI) for uplink) may be included. A TTI may be expressed in terms of an integer number of one of more BTI(s) that may be predetermined and/or may be associated with a SOM. Supported frame duration may include, for example, 100 μs, 125 μs (⅛ ms), 142.85 ns (1/7 ms is 2 nCP LTE OFDM symbols), and/or 1 ms. Such durations may facilitate alignment with a timing structure.

Figure 4A:
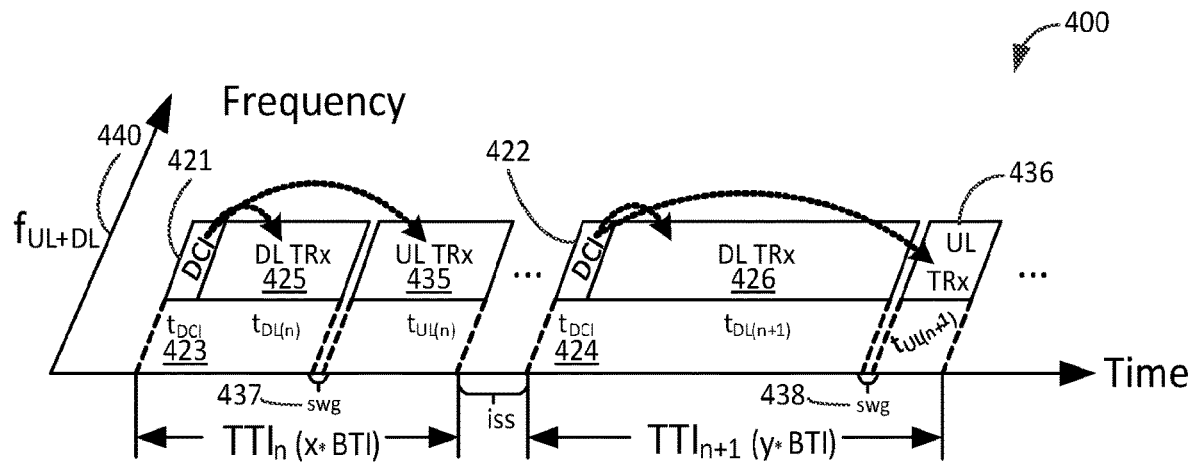
FIG. 4A is an illustration of an example of timing relationships for TDD duplexing.
Figure 4B:
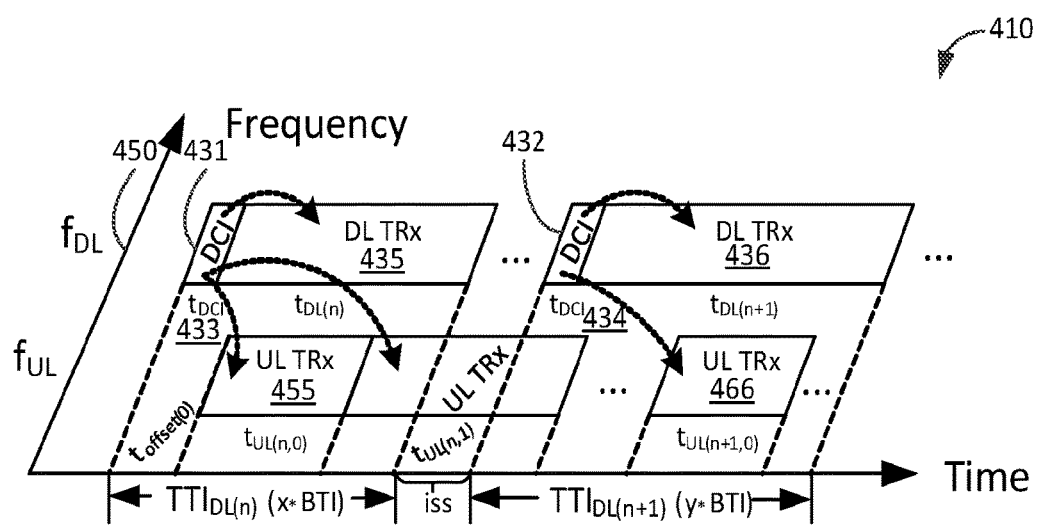
FIG. 4B is an illustration of an example of timing relationships for FDD duplexing.

FIGS. 4A and 4B show exemplary frame structure 400 of a TDD frame and exemplary frame structure 410 of an FDD frame, respectively. A frame may begin with downlink control information (DCI) (e.g., DCIs 421 and 422 of FIG. 4A, DCIs 431 and 432 of FIG. 4B) of a fixed time duration $t_{dci}$, (e.g., $t_{dci}$ 423 and $t_{dci}$ 424 of FIG. 4A, $t_{dci}$ 433 and $t_{dci}$ 434 of FIG. 4B) that may precede a downlink data transmission (DL TRx) (e.g., DL TRx 425 and DL TRx 426 of FIG. 4A, DL TRx 435 and DL TRx 436 of FIG. 4B) for a carrier frequency (e.g., $f_{UL/DL}$ 440 for TDD frame 400, and $f_{DL}$ 450 for DL portion of FDD frame 410).

In TDD duplexing, a frame may include a downlink portion (DCI and DL TRx, such as, e.g., DCI 421 and 422 of FIG. 4A, DL TRx 425 and DL TRx 426 of FIG. 4A) and/or an uplink portion (UL TRx, such as, e.g., UL TRx 425 and UL TRx 426 of FIG. 4A). A switching gap (SWG), such as exemplary SWGs 437 and 438 illustrated in FIG. 4A, may precede an uplink portion of a frame.

In FDD duplexing examples, a frame, such as, for example, frame 410 of FIG. 4B, may include a downlink reference TTI and one or more TTI(s) for the uplink. The start of an uplink TTI may be derived using an offset ($t_{offset}$) that may be applied from a start of a downlink reference frame that may overlap with a start of an uplink frame.

In TDD duplexing examples, D2D, V2x, and/or Sidelink (which may each be referred to interchangeably herein) operation may be supported in a frame, such as, e.g., frame 400 of FIG. 4A. Respective downlink control and/or forward direction transmissions may be included in a DL TRx portion (e.g., for dynamic allocation) (e.g., DL TRx 425 and DL TRx 426 of FIG. 4A) and/or in a DCI+DL TRx portion (e.g., if a semi-static allocation of the respective resources is used) (e.g., DCI 421 and 422 of FIG. 4A, DL TRx 425 and DL TRx 426 of FIG. 4A). Respective reverse direction transmissions in a UL TRx portion may also be included.

In FDD duplexing examples, D2D, V2x, and/or Sidelink (which may each be referred to interchangeably herein) operation may be supported in a frame, such as, e.g., frame 410 of FIG. 4B. A UL TRx portion of a frame, such as frame 410 of FIG. 4B, (e.g., UL TRx 455 and UL TRx 466 of FIG. 4B) may support D2D, V2x, and/or Sidelink by including, for example, respective downlink control and/or forward direction and reverse direction transmissions in the UL TRx portion. In such examples, dynamic allocation of respective resources may be used.

Flexible scheduling and/or rate control methods may be employed in exemplary systems and methods. At least two scheduling modes may be supported that may include network-based scheduling for relatively tight scheduling (e.g., in terms of resources, timing, and/or DL/UL transmission parameters) and WTRU-based scheduling (e.g., that may be provide more flexibility of timing and/or transmission parameters). For either of such modes, a scheduling function may be supported in a MAC layer. Related scheduling information may be valid for a single TTI or for multiple TTIs.

Network-based scheduling may facilitate network management of available radio resources that may be assigned to various different WTRUs in a manner that may improve the sharing of such radio resources. Dynamic scheduling may be supported in network-based scheduling examples.

WTRU-based scheduling may facilitate a WTRU opportunistically accessing uplink resources with reduced latency, e.g., on a per-need basis and/or within a set of shared and/or dedicated uplink resources assigned (e.g., dynamically, not dynamically) by a network. Both synchronized and unsynchronized opportunistic transmissions may be supported. Contention-based transmissions and/or contention-free transmissions may be supported in the disclosed examples. Support for opportunistic transmissions (e.g., scheduled, unscheduled) may be included and may provide ultra-low latency that may be preferred by a RAT and/or power saving requirements that may be preferred by an mMTC.

To facilitate channel prioritization, association of data that may be available for transmission to resources that may be available for uplink transmissions may be facilitated. Multiplexing of data with different Quality of Service (QoS) requirements within a same transport block may be supported. In an example, such multiplexing may be supported where such multiplexing may not introduce a negative impact to a service that may have a stringent QoS requirement. Additionally, or instead, such multiplexing may be supported where such multiplexing may not introduce a negative impact to a service that may be relatively wasteful of system resources.

Forward error correction (FEC) and/or block coding may be facilitated by examples disclosed herein. A transmission may be encoded using one or more of several different encoding methods that may each have different characteristics. For example, an exemplary encoding method may generate a sequence of information units. Each such information unit (which may be referred to interchangeably herein as a "block") may be self-contained. An FEC block may be considered self-contained if an error in a transmission of a first FEC block may not impair a receiver's decoding of a second FEC block. For example, such a second FEC block may be error-free. Sufficient redundancy may be present in such a second FEC block (or, in some examples, in a different block) that one or more portions of the second FEC block may be successfully decoded.

Raptor and/or other fountain codes, as utilized in the disclosed examples, may include a sequence of N raptor codes. One or more such codes may be mapped to one or more transmission "symbols" in time. An example "symbol" may correspond to one or more sets of information bits (e.g., one or more octets). Such encoding systems and methods may be used to add FEC to a transmission when such a transmission may use, for example, N/1 and/or N/2 raptor codes (or symbols, e.g., where it may be assumed that a one-to-one raptor code-to-symbol relationship is present). Such a transmission may withstand a loss of one "symbol" (e.g., due to interference, due to puncturing by another transmission overlapping in time).

A WTRU may utilize one or more methods for allocating a transmission power of a WTRU to a transmission. DC-capable systems as described in the instant disclosure may facilitate independent scheduling instructions. Allocating total available power of a WTRU to different transmissions in DC-capable systems may be implemented using one or more of the various exemplary systems and methods described herein.

Figure 5:
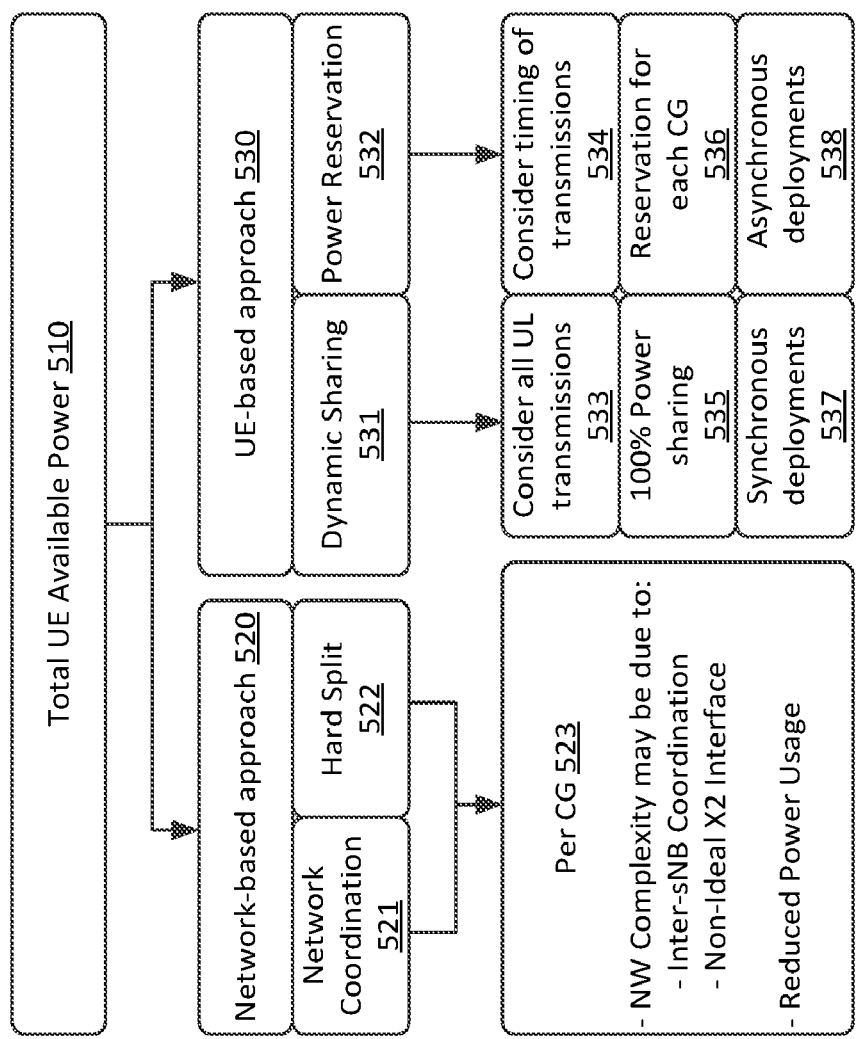
FIG. 5 is an overview of an example network-based and WTRU-based methods for power allocation.

FIG. 5 illustrates block diagram 500 that represents a network-based example (e.g. network-based approach 520 as shown in FIG. 5) and a WTRU-based example (e.g. WTRU-based approach 530 as shown in FIG. 5) for power control. Note that either, or both, such examples, or any variations and/or combinations thereof, may be implemented according to the instant disclosure without departing from the spirit and scope of the instant disclosure.

In diagram 500, a total amount of power 510 may be available to a WTRU (may be referred to as "$P_{cmax}$"). In exemplary network-based approach 520, network coordination 521 and/or hard split 522 may be performed for power allocation. In network coordination 521, a network may provide an indication of a set of rules that may be used to split available power between multiple transmissions. When a hard split 522 is utilized, the network may set the power levels (or set reserved power levels) for a set of transmissions. Power may be configured and/or distributed 523 per cell group. A network-based approach may increase the complexity of the network and the devices and software configured therein due to, e.g., coordination that may be performed among network nodes and/or usage of less-than-ideal network interfaces. Power usage may be reduced in such an approach.

In exemplary WTRU-based approach 530, dynamic sharing 531 may be performed, where all uplink transmissions may be considered 533 and/all available power may be shared 535. WTRU-based approach 530 using dynamic sharing 531 may be used in synchronous deployments 537. When dynamic sharing 531 is utilized, a WTRU may determine how to allocate power among multiple transmissions based on transmission characteristics (e.g., QoS, etc.) of the transmissions.

Also, or instead, in exemplary WTRU-based approach 530, a WTRU may perform power reservation 532, e.g., by a WTRU receiving from a network a configuration indicating such reservation for each group of cells of a portion of the total available power. In such an example, a WTRU may take into account the timing of transmissions, which may be used to allocate any unreserved portion of the total available power, if any, e.g., such as to allocate such portion to the transmissions of a cell group with transmissions that occurs first in time. WTRU-based approach 530 using power reservation 532 may be used in any type of deployments but preferably in asynchronous deployments 538.

Two or more types of power control modes (PCMs), exemplary instances of which may be referred to herein as "PCM1" and "PCM2", may be defined according to examples set forth herein. In an example, PCM1 may be used for synchronous deployments (e.g., where a maximum timing difference between cells of different eNBs may be less than, or equal to, for example, 33 μs). In an example, in addition or instead, PCM2 may be used for uncoordinated deployments (e.g., where a maximum timing difference between cells of different eNBs may be less than, or equal to, for example, 500 μs). A WTRU capable of DC may support either or both of PCM1 and PCM2. In either or both modes, a WTRU may be configured with a minimum guaranteed power for each CG. Such power may be determined as a ratio of total available power $P_{cmax}$.

In a first power control mode, e.g., PCM1, a WTRU may allocate power, e.g., up to a minimum guaranteed power, to one or more CGs. Remaining power may be shared across one or more master cell groups (MCGs) and/or one or more secondary cell groups (SCGs), in an example, on a per-transmission basis (e.g., according to a priority order). A priority order that may be used to determine a method of distributing any remaining power may be based on any criteria, such as, for example, an uplink control information (UCI) type, a channel type, a CG type, and/or the like.

Figure 6:
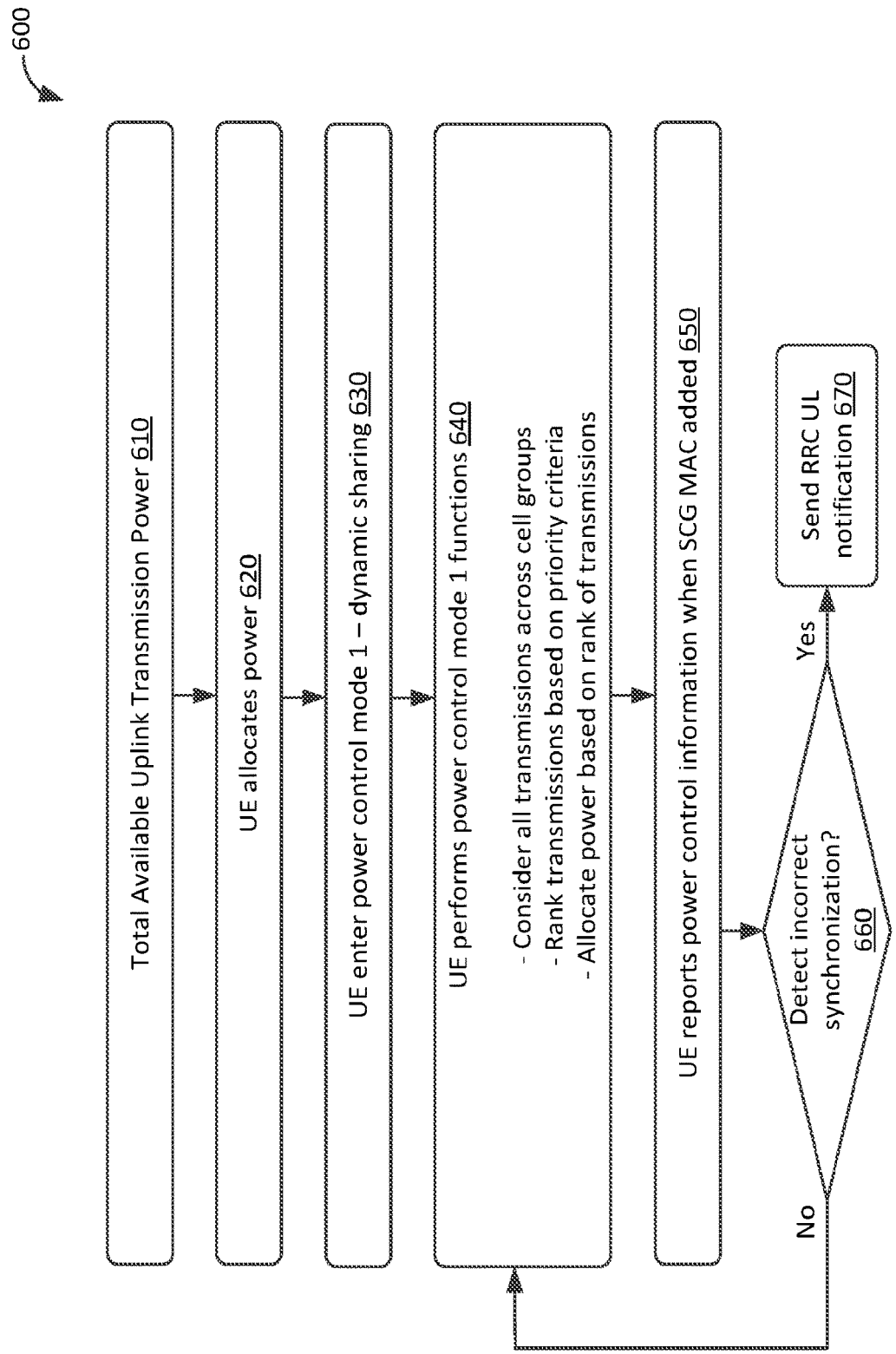
FIG. 6 is an overview of an example dynamic sharing method for power allocation.

An example method of implementing PCM1 is illustrated in block diagram 600 in FIG. 6. A total available uplink transmission power 610 ($P_{cmax}$) may be determined. At block 620, a WTRU may allocate at least a portion of the total available power $P_{cmax}$. The WTRU may use various criteria to determine this allocation, including, but not limited to, a presence of uplink control information (UCI), a type of UCI, an MCG, and/or an SCG. In an example, if all other criteria are equal, a WTRU may use an MCG and/or an SCG to determine how to allocate $P_{cmax}$. Any of these criteria and/or any other types of criteria may be used, in any order, according to the disclosed examples.

At block 630, a WTRU enter power control mode 1, which may also be referred to as dynamic sharing. At block 640, a WTRU may perform PCM1 functions, such as, but not limited to, ranking all CGs based on priority criteria and allocating power based on such rankings. In an example, a WTRU may determine priority based on a presence of UCI (e.g., to determine priority of PUSCH and PUCCH transmissions), a type of UCI (e.g., HARQ A/N, CSI, SR), types of cell groups (e.g., MCG maybe given priority over SCG; this criteria may be used to break a "tie" if all other priority criteria are equal), and a type of transmission (e.g., PRACH may be given higher priority than other types). Any of these criteria and/or any other types of criteria may be used, in any order, according to the disclosed examples. A WTRU may allocate $P_{cmax}$ in decreasing priority order at block 640.

At block 650, a WTRU may report power control information, in an example, when an SCG MAC may be initially added or detected. For example, a WTRU may trigger reporting of a power headroom report (PHR) when a first cell of an SCG may be initially added or detected (e.g., addition of a PSCell). At block 660, if a WTRU detects incorrect synchronization, the WTRU may cease UL transmissions for all cells of an SCG. This may occur when a WTRU determines that a maximum timing difference between CGs exceeds a threshold. The WTRU may also transmit an RRC UL notification.

Figure 7:
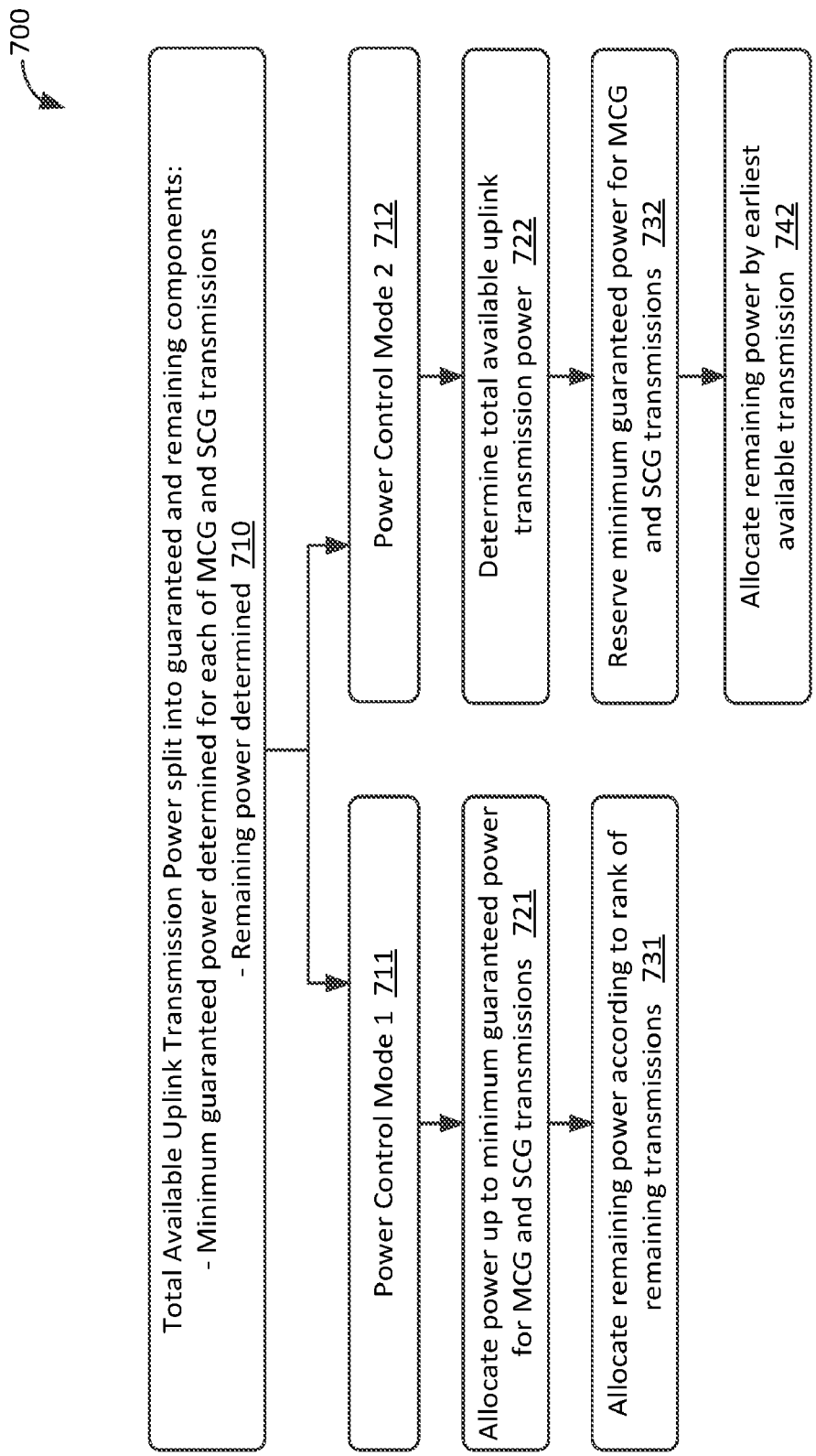
FIG. 7 is an overview of example power control modes method for power allocation.

In PCM2, a WTRU may reserve a minimum guaranteed power for each CG and may make any remaining power available first to a CG with transmissions that start earliest in time. This is further illustrated in block diagram 700 of FIG. 7, which provides an example method of implementing PCM1 and/or PCM2. The method described in regard to FIG. 7 may be used for power allocation for PUSCH and/or PUCCH.

At block 710, the overall process for either mode is briefly described, where total available transmission power $P_{cmax}$ may be split into guaranteed and remaining components. The guaranteed component may be a minimum guaranteed power for MCG transmissions (may be referred to as "$P_{MeNB}$") and a minimum guaranteed power for SCG transmissions (may be referred to as "$F_{SeNB}$"). The values of guaranteed power components $P_{MeNB}$ and $P_{SeNB}$ may be determined as a ratio of a guaranteed power component to a total available transmission power or as a percentage of total available transmission power. The remaining power may then be represented as $P_{cmax}*(1-(P_{MeNB}+F_{SeNB}))$.

At block 711, power control mode 1 functions may be performed. These may include allocating power up to the amount of power needed for guaranteed power components $P_{MeNB}$ and $P_{SeNB}$ at block 721 and allocating remaining power to remaining transmissions at block 731, in an example, using a ranking for the remaining transmissions as set herein in regard to FIG. 6 or any other ranking methods set forth herein or otherwise.

At block 712, power control mode 2 functions may be performed. These may include determining at block 722 a total available transmission power $P_{cmax}$ by determining an upper and lower bound for $P_{cmax}$ while accounting for overlapping portions of two subframes of another CG. At block 732, the amount of power needed for guaranteed power components $P_{MeNB}$ and $F_{SeNB}$ may be determined and reserved. At block 742, any remaining power may be allocated to the remaining CGs in the order of the CG's transmission time, e.g., a WTRU may reserve power for the CG with the earliest transmission time, the CG with the next earliest transmission time next, etc.

Note that for PCM2 examples, asynchronous timing, e.g., 0-500 μs between CGs, may be used. In such examples, $P_{cmax}$, $P_{MeNB}$, and $P_{SeNB}$ may be configured by RRC. The use of power reservation in PCM2 examples may reduce any processing time penalty.

Note also that for PCM1 examples, synchronous timing, e.g., less than 33 μs between CGs, may be used. In such examples, all of $P_{cmax}$ may be used.

A WTRU or UE may apply other methods for allocating transmission power to meet challenges that may be presented by emerging radio access technologies. Such technologies may emphasize flexibility in allocating transmission power. The disclosed systems and methods may be used with any network configuration that may support a UE or WTRU. For example, an exemplary WTRU may be configured with a single cell and/or carrier that may use a single MAC instance. Power control may be performed across some or all applicable transmissions associated with such a single MAC instance. In an example, a WTRU may be configured with two or more cells and/or carriers using a single MAC instance such that power control may be performed across some or all applicable transmissions associated with the single MAC instance. In an example, a WTRU may be configured with two or more groups of cells and/or carriers with each group being handled by a different MAC instance. Power control may be performed across some or all applicable transmissions associated with the different MAC instances.

A WTRU may determine available power per time interval. This determination may be made using varied time scales. Such time scales may correspond to, for example, a minimum scheduling interval for a given transport block (e.g., for a fully dynamically scheduled operation), a minimum TTI for such a transport block (e.g., where transmissions may be performed autonomously by the WTRU), and a minimum transmission time interval for a given block code. These time scales may hereafter be referred to as "time intervals."

A WTRU may determine the total available power using a longer time interval. In an example, a WTRU may refine a remaining total available power for shorter intervals, e.g., when further scheduling instructions are available. A WTRU configured with OFDM operation may determine a new value for $P_{CMAX}$ for the start of each time interval associated with such transmissions. A WTRU that may be configured with filtered OFDM may reuse a same value for $P_{CMAX}$ for shorter intervals when such transmissions overlap with an OFDM transmission.

A WTRU may be configured to determine an available amount of power. For example, maximum transmission power may differ for different subsets of one or more transmissions (e.g., there may be a $P_{CMAX}$ value per subset of transmissions). A subset of transmissions may be, for example, based on a use of different waveforms and/or numerologies. For example, there may be a $P_{CMAX}$ value for each subset of transmissions using a same waveform and/or using a same transmission numerology. A waveform and/or same transmission numerology may be associated with one or more SOMs.

In an example, available power may be determined based on a waveform used in uplink transmissions. For example, a maximum transmission power (e.g., $P_{CMAX}$) for a first waveform (e.g., OFDM) may be smaller than a maximum transmission power for a second waveform (e.g., single carrier), where the maximum transmission power may be determined as a function of a power back-off utilized in a certain waveform. In an example, a power headroom reporting value may be determined based on a waveform assumed.

A waveform for uplink transmissions may be determined using one or more of various factors including, but not limited to, a SOM associated with a relevant transmission and an uplink resource used, configured, or assumed. A waveform may be configured in a WTRU-specific manner (e.g., using higher layer signaling). For example, a waveform may be determined as a transmission mode is configured. A waveform may be replaced by a transmission mode, a transmission scheme, and/or a transmission numerology that may be consistent with the instant disclosure. A waveform for uplink transmissions may also be determined based on associated downlink control channels. For example, one or more downlink control channels may be used and each downlink control channel may be associated with a waveform. If a WTRU receives a DCI for an uplink transmission, the waveform for the uplink transmission may be determined based on the downlink control channel in which the DCI is received. A waveform may be determined based on the search space of a downlink control channel, a service type, a WTRU capability, a WTRU category, and/or the like.

Figure 8:
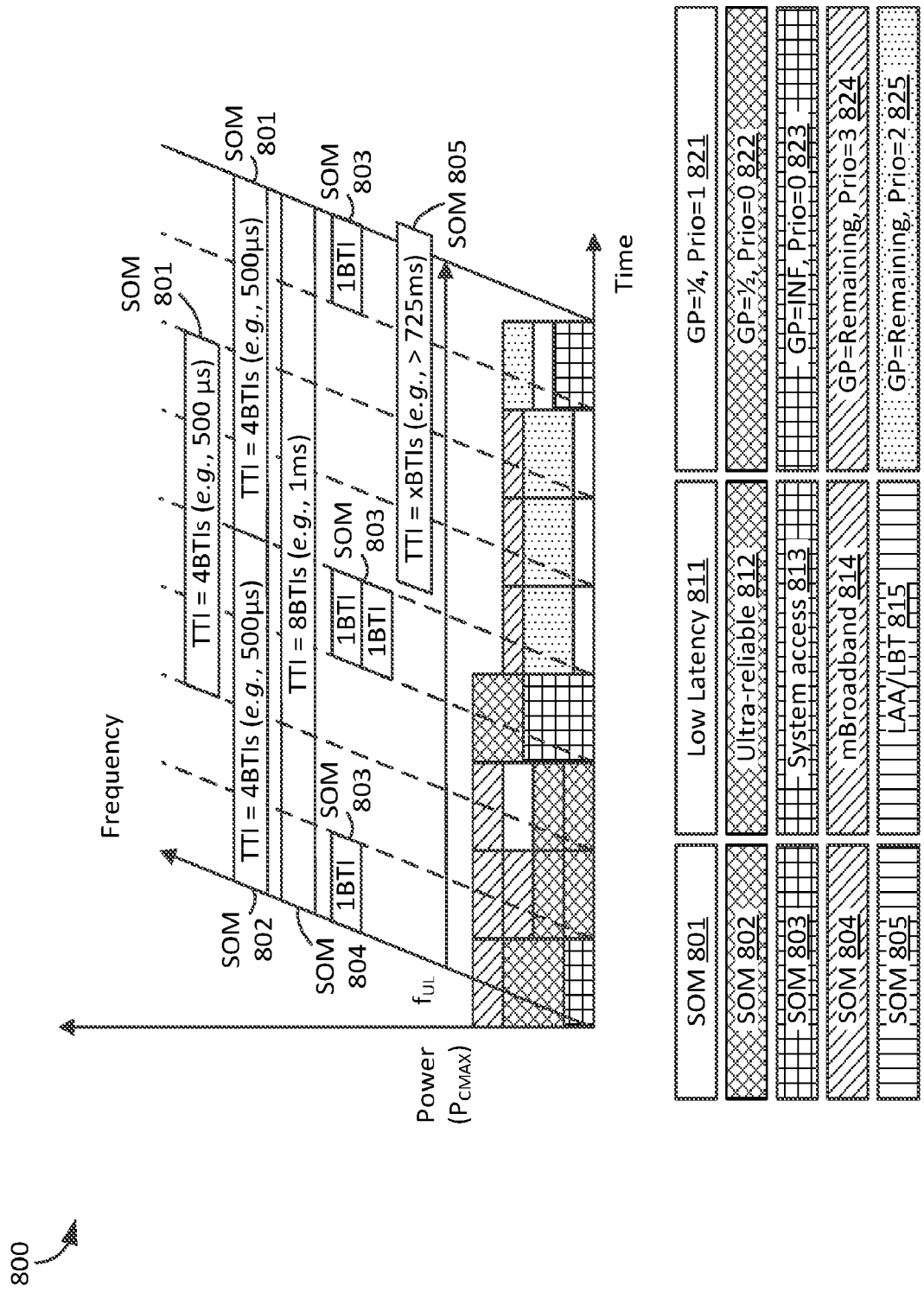
FIG. 8 is an illustration of example SOM transmissions.

In an example, transmissions of different SOM may overlap in time. FIG. 8 shows chart 800 that illustrates a $P_{CMAX}$ that may be calculated at a first time scale and then be split using multiple levels of guaranteed power (e.g., one per SOM) using a second, different time scale. Transmission power may vary for some types of transmissions based on, for example, their respective priority. Transmissions may scale down to zero power if needed, as illustrated by FIG. 8.

FIG. 8 also illustrates how power allocated for a given transmission may vary over the course of such a transmission (note that transmissions are labeled with their respective associated SOMs and characteristics in parentheses). For example, a transmission associated with SOM 804 in FIG. 8 may be associated with mBroadband transmission 814 and/or may be associated with a SOM used for mobile broadband access. SOM 804 may have a relatively low power allocation priority (e.g., priority=3,824) in this example, where a lower priority level may be associated with a more prioritized allocation. SOM 804 may not have a guaranteed reservation of maximum power (e.g., $P_{CMAX}$). SOM 804 may utilize remaining power when available. SOM transmissions, such as SOM 804 in this example, may have a 1 ms TTI length (e.g., a TTI length of 8 BTIs, as shown in the non-limiting example of FIG. 8 and transmission 804).

As illustrated in FIG. 8, a WTRU may be configured to support transmissions of SOMs used for various purposes. For example, exemplary SOM 801 may be associated with low latency transmission-type 811, may have a TTI length of 4 BTIs (e.g., 500 μs), may have guaranteed power reservation 821 of ¼ of $P_{CMAX}$, and may have a priority of 1.

Also as illustrated in FIG. 8, exemplary SOM 802 may be associated with ultra-reliable transmission-type 812, may have a TTI length of 4 BTIs (e.g., 500 μs), may have guaranteed power reservation 822 of ½ of $P_{CMAX}$, and may have a priority of 0.

Also as illustrated in FIG. 8, exemplary SOM 803 may be associated with system access transmission-type 813, may have a TTI length of 1 BTI (e.g., 125 μs), may have guaranteed power reservation 823 of $P_{CMAX}$ (e.g., may be provided with sufficient power to ensure a transmission may be received at a desired signal energy level), and may have a priority of 0.

Also as illustrated in FIG. 8, exemplary SOM 805 may be associated with LAA/LBT transmission 815, may have a variable TTI length that may be greater than a certain amount of time (in this example, where an associated TTI may be greater than 725 ms), may not have a guaranteed reservation 825 of maximum power (e.g., $P_{CMAX}$), may utilize remaining power when available, and may have a priority of 2.

As illustrated in FIG. 8, SOM transmission 804 may be performed across a 1 ms time span. In an example, during transmission, an amount of available power allocated for SOM transmission 804 may vary. For example, during periods where there may be few or no higher priority SOMs that may be simultaneously transmitting, SOM transmission 804 may be allocated a relatively higher amount of power (e.g., 8BTIs in the illustrated example).

Where two higher priority (e.g., and also shorter) transmissions may be performed in a same BTI (e.g., such as SOM transmissions 802 and 803 that may be in a same BTI as shown in FIG. 8 and that may each have a priority of 0), some or all of power previously allocated to a lower priority SOM (e.g., such as SOM transmission 804 that may have a priority of 4) may be reallocated to, e.g., higher priority SOM transmissions 802 and 803.

Once, for example, SOM transmissions 802 and/or 803 may be complete, SOM transmission 802 and 803 may be reallocated to provide power in a next BTI that may complete a transmission. Note that, in an example, $P_{CMAX}$ may be reduced for a second half of SOM transmissions 804. FIG. 8 illustrates how power allocated to a transmission associated with a specific SOM may be varied over the course of a transmission, e.g., in order to allocate power to a higher priority transmission.

In an example, a WTRU may report a power headroom for one or more service types, waveforms, and/or SOMs. For example, a WTRU may be configured with one or more service types, waveforms, and/or SOMs. Such a WTRU may report power headroom for each service type, waveform, and/or SOM separately. A WTRU may receive an indication of whether a power headroom report should be sent for a given service type, waveforms, and/or SOM. For example, a WTRU may initiate transmission of a power headroom report upon receiving an indication that may identify a service type, waveforms, and/or SOM associated with the requested power headroom information. Headroom reporting may be triggered by an eNB that may indicate a type of service, waveform, or SOM for which it may need power headroom information.

One or more parameters in a power control formula may be determined as a function of a service type, a waveform, and/or associated downlink control channels. A pathloss parameter may be measured from a different downlink reference signal according to a service type, waveform, and/or associated downlink control channels. $P_o$ (e.g., a cell-specific nominal power) may be determined based on a service type, a SOM, a waveform, and/or associated downlink control channels.

After determining a total available power per time interval, a further determination may be made for a proper power level for a specific transmission based the total available power and one or more characteristics of the specific transmission. For example, such a determination may consider different MAC sub-layers with which a WTRU may be configured. Each such sub-layer may be configured to handle different sets of transmission aspects. Such aspects may be specific to each MAC instance. Such aspects may include one or more SOMs (e.g., a group of one or more transmission characteristics), applicable numerology, control channel(s), transport channel(s), HARQ processing type(s), RNTI(s), group(s) of cell(s)/carrier(s) and/or spectrum block(s).

A determination of power level may consider SOMs with which a WTRU may be configured to perform transmissions. For example, a SOM may correspond to transmissions that use one or more of a specific TTI duration, a specific initial power level, a specific HARQ processing type, a specific upper bound for successful HARQ reception/transmission, a specific transmission mode, a specific physical channel (uplink or downlink), a specific waveform type, a specific transmission numerology, and/or a transmission according to a specific RAT (e.g., legacy LTE or according to a 5G transmission method). A SOM may correspond to a QoS level and/or related aspects (e.g., maximum/target latency, maximum/target BLER or similar). A SOM may correspond to a spectrum area and/or to a specific control channel or aspects thereof, including, for example, search space, DCI type, and the like. A SOM may be associated with a specific encoding method (e.g., one utilizing FEC and/or block coding) applied to the transmissions.

A determination of power level may consider a control and/or transport channel that may be used by a WTRU. For example, a WTRU may be configured to receive one or more control channels where each control channel may be associated with a specific MAC instance, a specific SOM, a specific transport channel, a specific cell/carrier, a specific scheduling method, and/or a specific RNTI.

A WTRU may be configured to receive and/or to transmit on one or more transport channels. Each of such transport channels may be associated with a specific MAC instance, a specific SOM, a specific transport channel, a specific cell/carrier, a specific scheduling method, and/or a specific RNTI.

A determination of power level may consider a scheduling mode of a WTRU. For example, a WTRU may be configured to perform transmissions using one or more scheduling modes, such as a fully scheduled mode where most if not all transmission aspects may be controlled by a network (e.g., semi-persistent scheduling, dynamic scheduling), an opportunistic mode where one or more subsets of transmission aspects may be autonomously determined by the WTRU (e.g., contention-based uplink transmissions, D2D/Sidelink transmissions), or a contention-based and/or asynchronous mode (e.g., a WTRU with Listen-before-talk (LBT) functions where resources of a physical channel may be gained by the WTRU using contention access).

A determination of power level may consider a power control mode of a WTRU, including, but not limited to, the PCMs set forth herein. For example, a WTRU may be configured with one or more PCMs. A PCM may include a power allocation method and one of more sets of power levels (e.g., guaranteed power as ratio of total available power $P_{CMAX}$ or similar). An allocation method may be based on sharing up to 100% of the power level associated with a PCM, reserving up to 100% of the power level associated with a PCM, and/or maximum levels for each priority level supported by a PCM. A PCM may be used with any or all transmissions of a WTRU. In such an example, a PCM may be associated with one set of one or more power levels that may correspond to, for example, guaranteed power levels.

A WTRU may be configured to use a first PCM for a first subset of transmissions using a first level of guaranteed power (e.g., a first portion of the total WTRU available power) and a second PCM for a second subset of transmissions using a second level of guaranteed power (e.g., a second portion of the total WTRU available power). A WTRU may be configured with a first PCM for a MAC instance that may be configured for a scheduled (e.g., non-LBT) operations over a Uu interface that may be associated with one or more cells/carriers and a second PCM for use with unscheduled (e.g., contention-based or LBT-concurrent) operations for specific transmissions. A PCM may be configured with a reserved amount of power, e.g., as a ratio of the total available power.

A WTRU may be configured with different SOMs concurrently. For example, a WTRU may be configured to associate one or more transmissions with a first SOM (e.g., using a TTI of a first duration, such as 1 ms) and one or more transmissions with a second SOM (e.g., using a TTI of a second duration, such as 125 μs). In such an example, the WTRU may apply a first PCM (e.g., $P_{CMAX}$) or a portion (e.g., according to a ratio) $P_x$ of $P_{CMAX}$ to transmissions associated with the first SOM and apply a second PCM (e.g., PCMy) or a portion (e.g., according to a ratio) $P_y$ of $P_{CMAX}$ to transmissions associated with the second SOM.

A determination of power level may consider transmission modes and/or transmission characteristics such as waveform-related characteristics. A WTRU may be configured with one or more transmission modes in which one or more aspects of a processing procedure for signal reception and/or transmission may vary. Such aspects may be dynamically determined and may be related to various waveform processing including, e.g., a type of waveform, absence, presence and/or duration of cyclic prefix, an absence or presence of a zero tail of a specific characteristic (e.g., fixed CP with zero power generated from zero padding), methods to apply when generating ZT and/or ZP (e.g., DFT spreading), redundancy coding (e.g., block coding), and/or the like. The WTRU may perform power allocation at different time scales. For transmissions starting at the beginning of a TTI of a first duration (e.g., 1 ms), the WTRU may allocate power to some or all transmissions associated to the applicable PCM (e.g., PCMx) up to the value of Px. If the WTRU is configured with dual connectivity, further power control allocation may be performed (e.g., using the legacy PCM or variants thereof or other methods described herein) and be applied across one or more subsets of transmissions and up to the value of Px. For transmissions starting at the beginning of a TTI of a second duration (e.g., 125 µs), the WTRU may allocate power to some or all transmissions associated to the applicable PCM (e.g., PCMy) up to the value of Py. If the WTRU is configured with dual connectivity, further power control allocation may be performed (e.g., using the legacy PCM or variants thereof or other methods described herein), and be applied across one or more subsets of transmissions and up to the value of Py.

A WTRU may determine a priority associated with a given transmission as a function of one or more MAC instances that may be associated with the transmission, with a SOM associated with the transmission, with a control channel used to configure the transmission, with a transport channel associated with the transmission, with a scheduling mode associated with the transmission, with a PCM associated with the transmission, and/or with a combination thereof. A priority may be applied within a subset of transmissions or may be WTRU-specific (e.g., be applicable for a prioritization method applied across some or all transmissions of the WTRU for a given time instant). A WTRU may give higher priority to transmissions associated with a specific SOM (e.g., for ultra-reliable transmissions before other type of transmissions). A WTRU may give different (e.g., higher) priority levels to transmissions associated with a specific state of a HARQ process including type, (re-)transmission number for a process, retransmission in a bundled sequence, redundancy version, or an expired or remaining transmission time. A higher priority level may be assigned to ensure that a given amount of power be available for transmissions associated with a specific SOM and/or for a limited time corresponding to a possible transmission of such type, for example.

Different priority levels may be given to transmissions associated with a specific type of encoding (e.g., FEC, raptor codes, block coding methods). For example, a lower priority may be given to a transmission using block coding and a higher priority may be given to other coding techniques (e.g., raptor codes). A WTRU may apply a power control function such that the power level may be changed during an on-going transmission. A change in power level may be applicable per block code and/or may be maintained, for example, for a block code's associated duration within the transmissions. A change in power allocation may be, for example, a reduction to a zero power level or near such level when transmissions include FEC. A change in power level may be applied to, for example, a subset of a total number of block codes. Such a subset may be less or equal to the number of block codes added for the purpose of FEC.

A WTRU may determine a power level associated with a given transmission as a function of one or more of the disclosed aspects and at a granularity that may correspond to the one or more of the disclosed aspects. A power level may be semi-static or may vary dynamically for a given period or interval. For example, a power level may be one of a minimum guaranteed power, a maximum power, a target power, a remaining power following a first round of power allocation, or a ratio of the total available power. Such a power level may also be a minimum amount of power required for transmissions associated with a specific SOM (e.g., for ultra-reliable transmissions, for D2D/Sidelink, for LBT-based access). A power level may be a required amount of power for transmissions associated with a specific type of scheduling (e.g., for a time corresponding to an access attempt using LBT or a period during which a WTRU does not determine a medium to be busy).

In an example, power determination and allocation may be performed at different time scales or intervals. For example, a WTRU may perform a first allocation of power at a time scale that may correspond to a longest transmission time interval. The outcome of such a process may lead to a portion of a total available power being committed to a first subset of the WTRU's transmission for the interval while some power may remain. The WTRU may perform subsequent allocation of the remaining power at a time scale that may correspond to a shorter time interval using a difference between the total available power and the amount of power already committed to ongoing transmissions (e.g., those associated with a longer time interval).

A WTRU may apply the power allocation function on a per transmission basis, on a per symbol basis, and/or on a per block code duration basis. When the power allocation is applied per block code duration, a duration may correspond to a basic time interval (BTI) (e.g., including at every symbol) or to a multiple of a BTI.

A WTRU may apply different power levels as a function of time for a specific transmission. The WTRU may re-assign power already committed to a transmission (e.g., having lower priority) to another transmission (e.g., having higher priority). The WTRU may re-assign power already committed to a portion (e.g., that of lower priority) of a transmission to another portion (e.g., that of higher priority) of the transmission. Modifications of a power level may be allowed at specific times for a given transmission. Times where power level modification may be permitted for a transmission may include, but are not limited to, at every basic time interval (BTI) (e.g., including at every symbol) or multiple of BTI following a start of a transmission, at a start of the transmission of a block code, at times that may correspond to boundaries between code blocks, at every minimum TTI duration (where a minimum TTI duration may correspond to the minimum TTI duration across all or a subset of configured SOMs or for the SOM pertaining to the transmission), and at any time when a transmission associated with a one or more SOMs may be initiated. Such SOMs may correspond to a configured SOM or to a SOM configured with a higher priority than the SOM associated with the transmission.

A power allocation function as set forth herein may assume that no power level modification is permitted outside of the times described herein for power modification. In such an example, power used by the transmission may not be reclaimed. A power level modification or recalculation for an on-going transmission may be triggered every time a power level modification is permitted as described herein, when a transmission from a specific SOM (e.g., one of higher priority) is initiated, and/or when a transmission from a specific SOM (e.g., one of higher priority) ends.

A WTRU may not be allowed to modify a power level for one or more symbols associated with one or more characteristics (e.g., certain types of signals and/or transmissions). For example, a WTRU may be configured such that, for transmissions associated with a certain transmission characteristic, the WTRU may determine that no power level modification may be performed (e.g., allowing neither an increase nor decrease in power level), that a decrease in power level may not be performed (e.g., while allowing an increase in power level if triggered), and/or that an increase in power level may not be performed (e.g., while allowing a decrease in power level if triggered). A WTRU may not be allowed to change, for example, a power level for a symbol that may include one or more reference signals. A WTRU may not be allowed to change a power level for a symbol when the symbol includes one or more demodulation reference signals (e.g., DM-RS), when the symbol includes one or more sounding reference signals (e.g., SRS), when the symbol includes one or more synchronization signals, when the symbol may be associated with a transmission of a preamble, when a symbol may be associated with a transmission that may include control information, when the symbol may be associated with a transmission that may include uplink control information such as HARQ feedback, and/or the like.

Variation in power level may be bounded as a function of the power of reference signals. For example, a WTRU may be configured to not exceed a threshold level of change in power level. Such a WTRU may determine a value of such a threshold as a function of a power level used for other symbols associated with the relevant transmission. For example, a maximum amount of change in power level may be configured to not exceed a specific amount of a power level used for a reference signal associated with the relevant transmission. Such reference signal may be, for example, a demodulation signal. A maximum amount of change in power level may not, for example, be permitted to exceed a specific ratio between the power level of the modified symbol and the power level of another symbol. Such other symbols may include, but are not limited to, a symbol using a nominal transmission power level (e.g., a power level expected for a symbol assuming no power limitation would occur), a symbol transmitted with a highest power level for a relevant ongoing transmission, and a symbol that may include one or more reference signals (e.g., a synchronization signal, a reference signal, a preamble, a demodulation reference signal). Such a threshold may be applicable if a change in power level for relevant symbols is for a decrease in power level. A WTRU may use an alternative location, power level, and/or density for one or more reference signals when, for example, the WTRU determines that a power level for one or more symbols of the relevant transmission may be modified.

Where a power level modification may result in a decrease of power, or a decrease of power below a threshold, the power level may be set to zero until power may be modified and allocated above a threshold. Such power reduction may be applied, for example, to transmissions that use a specific coding method or transmissions that include FEC, or at a per information block granularity (e.g., for a multiple of BTIs that correspond to one or more block code symbols).

When a power level modification occurs, a WTRU may adapt other aspects of a transmission to improve the likelihood of successful reception. Such a transmission aspect may include a remaining duration of a transmission. For example, where a power level of a transmission is reduced (or increased), a duration of the transmission may be extended (or shortened). The WTRU may adjust the duration of such a transmission such that the transmission ends after a total amount of energy (e.g., product of time and power) has been reached. Such transmission aspect may include, but are not limited to, a modulation and coding scheme, redundancy version(s) used during transmission, and a frequency allocation. When a parameter of a transmission may be modified above (or below) a threshold, a WTRU may abandon the transmission. For example, a WTRU may abandon a transmission if a total duration or a remaining duration would exceed a maximum.

Additional information may be transmitted subsequently after the end of an impacted transmission. Such additional information may be a retransmission, scheduled or autonomously performed by the WTRU, or appended at the end of the impacted transmission (e.g., when variable TTIs are supported). Such additional information may comprise FEC and/or a retransmission of information impacted by the power level modification (e.g., impacted block codes).

Transmission power determined for one or more transmissions may be adjusted. With some radio access technologies (e.g., LTE), a WTRU may determine a transmission power for a certain type of transmission as a function of one or more factors. A factor that may be used for determining transmission power may be a desired reception power $P_o$ that may be signaled within system information for a given cell. A factor that may be used for determining transmission power may be a power for compensating propagation loss $PL_{DL}$, a value of which may be derived based on a pathloss estimation. A factor that may be used for determining transmission power may be a unit/fractional compensation coefficient (e.g., as may be represented by a symbol ∞ or the like), for example in the case of a Physical Uplink Shared Channel (PUSCH). A factor that may be used for determining transmission power may be an offset amount of power to meet a certain error rate and/or signal-to-interference-plus-noise ratio (SINR). Such an offset amount of power may be denoted by, for example, Mormat (e.g., for HARQ A/N, SR, CQI, or any combination thereof on PUCCH), or AMCS (e.g., for PUSCH). A value of an offset may be derived as a function of a number of radio bearers (RBs) that may be used for PUSCH transmissions, for example. A factor that may be used for determining transmission power may be a correction based on transmission power control (TPC) information received from a network ∂ (e.g., in the range of +/−1 dB, 0 or 3 dB). Using one or more of these factors for determining transmission power, any other factors, or any combination of any factors, a WTRU may determine a power for a Physical Uplink Control Channel (PUCCH) (without a PUSCH) according to a function such as or similar to: $P_{PUCCH}=\text{fct}(P_o, PL_{DL}, \Delta\text{format}, \partial=\Sigma \text{ TPC})$. A WTRU may determine a required power for a PUSCH (without a PUCCH) according to a function such as or similar to: $P_{PUSCH}$=fct ($P_o$, ∞ $PL_{DL}$, 10 $\log_{10}$(M), ΔMCS, ∂=Σ TPC).

With some radio access technologies (e.g., 5GFLEX), a WTRU may adjust a power level for a given transmission as a function of one or more characteristics of an associated SOM. For example, a TPC applied to a calculation of power for a given transmission may be maintained per SOM, per waveform type, and/or per any of the aspects described herein or otherwise. An amount of power reduction (e.g., MPR applied to a determination of a total amount of available power) may be maintained per waveform type or per any of the aspects described herein or otherwise.

Transmission power adjustments may be made based on TTI durations. For example, a WTRU may apply a correction $∂_{tti}$ to a calculation of required power based on a duration of a transmission. Such a correction may be an additive coefficient (e.g., having a positive or negative value) or a multiplicative coefficient (e.g., having a fractional value). A coefficient may be applied to one or more components (e.g., such as Δformat, ΔMCS or the like) of a power calculation or to a sum of other components. For example, a shortest type of transmission may have full compensation (e.g., a coefficient of 1) while a longest type of transmissions may have a fractional compensation (e.g., a coefficient in the range $1 > ∂_{tti} > 0$).

An additive amount of correction for a data transmission $P_{som}$ may be estimated by a function such as or similar to: fct($P_o$, ∞ $PL_{DL}$, 10 $\log_{10}$(M), ΔMCS, ∂=Σ TPC, $∂_{tti}$). $∂_{tti}$ may differ for transmissions associated with different TTI durations and/or with different SOMs. For example, for a short TTI duration (e.g., 125 μs TTI) and/or for a first SOM associated with such a TTI duration, $∂_{tti}$ may be a positive non-zero integer amount measured in dB. For a longer TTI duration (e.g., 1 ms TTI) and/or for a second SOM associated with such a TTI duration, $∂_{tti}$ may be 0 dB. Such values may be used in cases where a 1 ms TTI is used as a reference power control equation.

A multiplicative amount of correction for a data transmission $P_{TRx}$ may be estimated by a function such as or similar to: fct($P_o$, ∞ $PL_{DL}$, 10 $\log_{10}$(M), ΔMCS, ∂=Σ TPC). For example, $P_{SOM}$ may be derived by multiplying $∂_{tti}$ with $P_{TRX}$. $∂_{tti}$ may differ for transmissions associated with different TTI durations. For example, for a short duration TTI (e.g., 125 μs), $∂_{tti}$ may be a positive non-zero coefficient. For a longer duration TTI (e.g., 1 ms), $∂_{tti}$ may be 1. Such values may be used in cases where a 1 ms TTI is used as a reference power control equation.

Transmission power adjustments may be made using a desired reception power $P_o$ and/or a function of one or more characteristics of the transmission. For example, a WTRU may determine a desired reception power $P_o$ for a given transmission as a function of a SOM. Such a determination may be related to an error rate and/or a target HARQ operating point for such transmission, for example. A correction amount $∂_{QoS}$ may be an additive coefficient (e.g., having a positive or negative value) or a multiplicative coefficient (e.g., having a fractional value) applied to $P_o$. For example, a transmission associated with a high reliability SOM may have full compensation (e.g., a coefficient $∂_{QoS}$ of 1) while a transmission associated with a mobile broadband SOM may have a fractional amount of compensation (e.g., a coefficient in the range $1 > ∂_{QoS} > 0$).

Transmission power adjustments may be made based on transmission characteristics and/or waveform processing characteristics. For example, a WTRU may apply a correction $∂_{wfm}$ to a calculated required power based on one or more aspects of a waveform processing associated with a transmission. Such aspects may include a type of waveform, a transmission mode associated with a waveform, a controlling parameter of a hybrid waveform (e.g., such as the use of a CP), a CP duration, use of a zero tail, and/or any other characteristics. Such correction may be an additive coefficient (e.g., having a positive or negative value) or a multiplicative coefficient (e.g., having a fractional value) coefficient. Such a coefficient may be applied to one or more components (e.g., Δformat, ΔMCS, or the like) of a power calculation or may be applied to a sum of components. For example, a normal-CP-OFDM transmission may have fractional compensation (e.g., a coefficient in the range $1 > ∂_{wfm} > 0$) while a transmission using filtering such as UF-OFDM may have full compensation (e.g., a coefficient $∂_{wfm}$ of 1).

The aforementioned correction, adjustment, or value $∂_{tti}$ may be a configuration aspect of a WTRU. A WTRU may determine specific values of a correction, adjustment, or $∂_{tti}$ using, for example, a lookup table of standardized values. A WTRU may include the configuration aspect as part of scheduling information that may be associated with a transmission. A configuration aspect may be associated with an identity of a SOM-specific control, data, and/or transport channel.

Power allocation and adjustment methods and systems described herein may also be performed for unscheduled transmissions, for example, if power requirements associated to transmissions of higher priority are first satisfied. A WTRU may apply power allocation for sub-TTI uplink transmissions (e.g., an uplink portion of TDD frames). A WTRU may consider the overlap between an uplink portion of a TDD frame and any other transmission. A WTRU may consider the overlap of an entire frame duration for a TDD frame with any other transmission (e.g., where a WTRU may be configured for both TDD and FDD operation and where the WTRU has one or more transmissions that overlap in time).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented in a wireless transmit/receive unit (WTRU), the method comprising:
receiving, from a network, a configuration indicating a first amount of transmission power to be reserved for a first subset of transmissions and a second amount of the transmission power to be reserved for a second subset of the transmissions, wherein the first subset of the transmissions is characterized by a first spectrum operation mode (SOM), the second subset of the transmissions is characterized by a second SOM, and the first SOM differs from the second SOM in at least one transmission aspect;

determining that one or more of a first transmission using the first SOM or a second transmission using the second SOM is to be performed;

allocating power to the one or more of the first transmission or the second transmission in accordance with the configuration; and performing the one or more of the first transmission or the second transmission using at least the allocated power.

2. The method of claim 1, wherein the at least one transmission aspect relates to a time interval associated with performing the one or more of the first transmission or the second transmission.

3. The method of claim 1, wherein the at least one transmission aspect relates to a transmission numerology.

4. The method of claim 1, wherein the at least one transmission aspect relates to at least one of a quality of service (QoS) level, a hybrid automatic repeat request (HARQ) processing aspect, or a waveform type.

5. The method of claim 1, wherein the first amount of transmission power to be reserved is equal to a first portion of a total amount of available transmission power for the WTRU, and wherein the second amount of transmission power to be reserved is equal to a second portion of the total amount of available transmission power for the WTRU.

6. The method of claim 5, further comprising determining a remaining amount of transmission power based on the total amount of available transmission power and allocating at least a portion of the remaining amount of transmission power to another transmission.

7. The method of claim 1, wherein the power is allocated to the one or more of the first transmission or the second transmission further based on a power control mode (PCM) associated the first SOM or the second SOM.

8. The method of claim 7, wherein the configuration further indicates the PCM associated the first SOM or the second SOM.

9. The method of claim 1, further comprising receiving, from the network, an indication of one or more characteristics of the first SOM or the second SOM.

10. A wireless transmit/receive unit (WTRU) comprising: a processor configured to:

receive, from a network, a configuration indicating a first amount of transmission power to be reserved for a first subset of transmissions and a second amount of the transmission power to be reserved for a second subset of the transmissions, wherein the first subset of the transmissions is characterized by a first spectrum operation mode (SOM), the second subset of the transmissions is characterized by a second SOM, and the first SOM differs from the second SOM in at least one transmission aspect;

determine that one or more of a first transmission using the first SOM or a second transmission using the second SOM is to be performed;

allocate power to the one or more of the first transmission or the second transmission in accordance with the configuration; and perform the one or more of the first transmission or the second transmission using at least the allocated power.

11. The WTRU of claim 10, wherein the at least one transmission aspect relates to a time interval associated with performing the one or more of the first transmission or the second transmission.

12. The WTRU of claim 10, wherein the at least one transmission aspect relates to a transmission numerology.

13. The WTRU of claim 10, wherein the at least one transmission aspect relates to at least one of a quality of service (QoS) level, a hybrid automatic repeat request (HARQ) processing aspect, or a waveform type.

14. The WTRU of claim 10, wherein the first amount of transmission power to be reserved is equal to a first portion of a total amount of available transmission power for the WTRU, and wherein the second amount of transmission power to be reserved is equal to a second portion of the total amount of available transmission power for the WTRU.

15. The WTRU of claim 14, wherein the processor is further configured to determine a remaining amount of transmission power based on the total amount of available transmission power and allocate at least a portion of the remaining amount of transmission power to another transmission.

16. The WTRU of claim 10, wherein the power is allocated to the one or more of the first transmission or the second transmission further based on a power control mode (PCM) associated the first SOM or the second SOM.

17. The WTRU of claim 16, wherein the configuration further indicates the PCM associated the first SOM or the second SOM.

18. The WTRU of claim 10, wherein the processor is further configured to receive, from the network, an indication of one or more characteristics of the first SOM or the second SOM.

* * * * *